(12) United States Patent
Kim

(10) Patent No.: US 12,476,296 B2
(45) Date of Patent: Nov. 18, 2025

(54) METHOD FOR CONTROLLING TEMPERATURE OF VEHICLE BATTERY

(71) Applicants: HYUNDAI MOTOR COMPANY, Seoul (KR); Kia Corporation, Seoul (KR)

(72) Inventor: Ki Hyun Kim, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 836 days.

(21) Appl. No.: 17/725,274

(22) Filed: Apr. 20, 2022

(65) Prior Publication Data

US 2023/0020687 A1    Jan. 19, 2023

(30) Foreign Application Priority Data

Jul. 14, 2021    (KR) .................. 10-2021-0092502

(51) Int. Cl.
*H01M 10/00*    (2006.01)
*H01M 10/44*    (2006.01)
(Continued)

(52) U.S. Cl.
CPC ........... *H01M 10/63* (2015.04); *H01M 10/44* (2013.01); *H01M 10/486* (2013.01); *H01M 10/613* (2015.04); *H01M 10/615* (2015.04); *H01M 10/625* (2015.04); *H01M 10/6556* (2015.04); *H01M 2220/20* (2013.01)

(58) Field of Classification Search
CPC .. H01M 10/63; H01M 10/625; H01M 10/613; H01M 10/655; Y02E 60/10
See application file for complete search history.

(56) References Cited

FOREIGN PATENT DOCUMENTS

JP    2020039226 A  *  3/2020  ............ H01M 10/63

OTHER PUBLICATIONS

Ogaki et al. Cooling Control System for Battery, Mar. 2020, See the Abstract. (Year: 2020).*

(Continued)

*Primary Examiner* — Tiffany Legette
*Assistant Examiner* — Monique M Wills
(74) *Attorney, Agent, or Firm* — MORGAN, LEWIS & BOCKIUS LLP

(57) ABSTRACT

A method for controlling a temperature of a battery using a vehicle thermal management system including an HVAC subsystem including a refrigerant loop through which a refrigerant circulates, a battery cooling subsystem including a battery coolant loop through which a battery-side coolant circulates, and a battery chiller transferring heat between the refrigerant circulating in the refrigerant loop and the battery-side coolant circulating in the battery coolant loop may include: measuring a battery temperature and SOC value of the battery when charging the battery; determining a target temperature optimized for charging of the battery based on the measured battery temperature and SOC; and adjusting a temperature of the battery-side coolant by controlling at least one of the HVAC subsystem and the battery cooling subsystem according to whether the HVAC subsystem operates, a result of comparing an ambient temperature and the battery temperature, and a result of comparing the battery temperature and the target temperature.

19 Claims, 6 Drawing Sheets

(51) Int. Cl.
*H01M 10/48* (2006.01)
*H01M 10/613* (2014.01)
*H01M 10/615* (2014.01)
*H01M 10/625* (2014.01)
*H01M 10/63* (2014.01)
*H01M 10/6556* (2014.01)

(56) References Cited

OTHER PUBLICATIONS

David Tracy, "An Extremely Detailed Look at the Porsche Taycan's Engineering Designed to Take on Tesla", Receba Nossa Newletter Gratuita, https://pontoon-e.com/an-extremely-detailed-look-at-the-porsche-taycans-engineering . . . , Sep. 20, 2019, pp. 1-25.

* cited by examiner

METHOD FOR CONTROLLING TEMPERATURE OF VEHICLE BATTERY

CROSS-REFERENCE TO RELATED APPLICATION

The present application claims priority to Korean Patent Application No. 10-2021-0092502, filed on Jul. 14, 2021, the entire contents of which is incorporated herein for all purposes by this reference.

BACKGROUND OF THE INVENTION

Field of the Invention

The present disclosure relates to a method for controlling a temperature of a vehicle battery, and more particularly, to a method for controlling a temperature of a vehicle battery optimally suitable for normal charging or fast charging of the battery when the battery is charged.

Description of Related Art

With a growing interest in energy efficiency and environmental issues, there is a demand for development of eco-friendly vehicles that can replace internal combustion engine vehicles. Such eco-friendly vehicles include electric vehicles which are driven by use of fuel cells or electricity as a power source and hybrid vehicles which are driven by use of an engine and a battery system.

Existing electric vehicles and hybrid vehicles have employed an air-cooled battery cooling system using internal cold air. In recent years, research is underway on a water-cooled battery cooling system that cools the battery by water cooling to extend all electric range (AER) to 300 km (200 miles) or more. Energy density may be increased by adopting a structure that cools the battery in a water-cooled manner using a heating, ventilation, and air conditioning (HVAC) system, a radiator, and the like. Furthermore, the water-cooled battery cooling system may make the battery system compact by reducing gaps between battery cells, and improve battery performance and durability by maintaining a uniform temperature between the battery cells.

To implement the above-described water-cooled battery cooling system, research is being conducted on a vehicle thermal management system integrated with a powertrain cooling subsystem for cooling an electric motor and electric/electronic components, a battery cooling subsystem for cooling a battery, and a heating, ventilation, and air conditioning (HVAC) subsystem for heating or cooling air in a passenger compartment.

Meanwhile, during fast charging of the battery, a maximum charge capacity of the battery varies depending on the temperature of the battery, so a charge time thereof may vary. Accordingly, it is necessary to optimally control the temperature of the battery to charge the battery to the maximum charge capacity during the minimum charge time (i.e., to achieve fast charging of the battery).

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling a temperature of a battery optimally suitable for normal charging or fast charging of the battery.

According to an aspect of the present disclosure, a method for controlling a temperature of a battery using a vehicle thermal management system including a heating, ventilation, and air conditioning (HVAC) subsystem including a refrigerant loop through which a refrigerant circulates, a battery cooling subsystem including a battery coolant loop through which a battery-side coolant circulates, and a battery chiller transferring heat between the refrigerant circulating in the refrigerant loop and the battery-side coolant circulating in the battery coolant loop may include: measuring a battery temperature and a state of charge (SOC) value of the battery when charging the battery; determining a target temperature optimized for charging of the battery according to the measured battery temperature and the measured SOC; and adjusting a temperature of the battery-side coolant by controlling at least one of the HVAC subsystem and the battery cooling subsystem according to whether the HVAC subsystem operates, a result of comparing an ambient temperature and the battery temperature, and a result of comparing the measured battery temperature and the target temperature.

The method may further include: determining whether the battery temperature is equal to or less than the target temperature when the HVAC subsystem operates in a cooling mode in a condition in which the ambient temperature of the vehicle is higher than a predetermined temperature; and adjusting a flow rate of the refrigerant directed toward a battery chiller of the battery cooling subsystem to a minimum flow rate when the controller concludes that the battery temperature is equal to or less than the target temperature.

The method may further include: determining whether an internal temperature of the vehicle is equal to or less than a corrected temperature required for cooling a passenger compartment of the vehicle when the controller concludes that the battery temperature exceeds the target temperature; increasing the flow rate of the refrigerant directed toward the battery chiller above the minimum flow rate when the controller concludes that the internal temperature is equal to or less than the corrected temperature required for cooling the passenger compartment, wherein the corrected temperature may be obtained by adding a correction value to a temperature required for cooling the passenger compartment set by a user.

The method may further include: determining whether the battery temperature is higher than or equal to the target temperature when the HVAC subsystem does not operate in a cooling mode in a condition in which the ambient temperature of the vehicle is higher than a predetermined temperature; and controlling a heater of the battery cooling subsystem to heat the battery-side coolant when the controller concludes that the battery temperature is lower than the target temperature.

The method may further include: determining whether the ambient temperature of the vehicle is lower than the battery temperature when the controller concludes that the battery temperature is higher than or equal to the target temperature; and controlling the battery cooling subsystem to cool the battery-side coolant using an ambient air when the controller concludes that the ambient temperature of the vehicle is lower than the battery temperature.

The method may further include: determining whether the temperature of the battery-side coolant is higher than or equal to a temperature of the refrigerant when the HVAC subsystem operates in a heating mode and the battery temperature is lower than the target temperature in a condition in which the ambient temperature of the vehicle is lower than a predetermined temperature; and controlling the heater of the battery cooling subsystem to heat the battery-side coolant when the controller concludes that the temperature of the battery-side coolant is higher than or equal to the temperature of the refrigerant.

The method may further include controlling the HVAC subsystem and the battery cooling subsystem to heat the battery-side coolant using the refrigerant when the controller concludes that the temperature of the battery-side coolant is lower than the temperature of the refrigerant.

The method may further include: determining whether the ambient temperature of the vehicle exceeds the battery temperature when the HVAC subsystem does not operate in a heating mode and the battery temperature is lower than the target temperature in a condition in which the ambient temperature of the vehicle is lower than a predetermined temperature; and controlling the battery cooling subsystem to heat the battery-side coolant using an ambient air when the controller concludes that the ambient temperature of the vehicle exceeds the battery temperature.

The method may further include controlling the heater of the battery cooling subsystem to heat the battery-side coolant when the controller concludes that the ambient temperature of the vehicle is equal to or less than the battery temperature.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
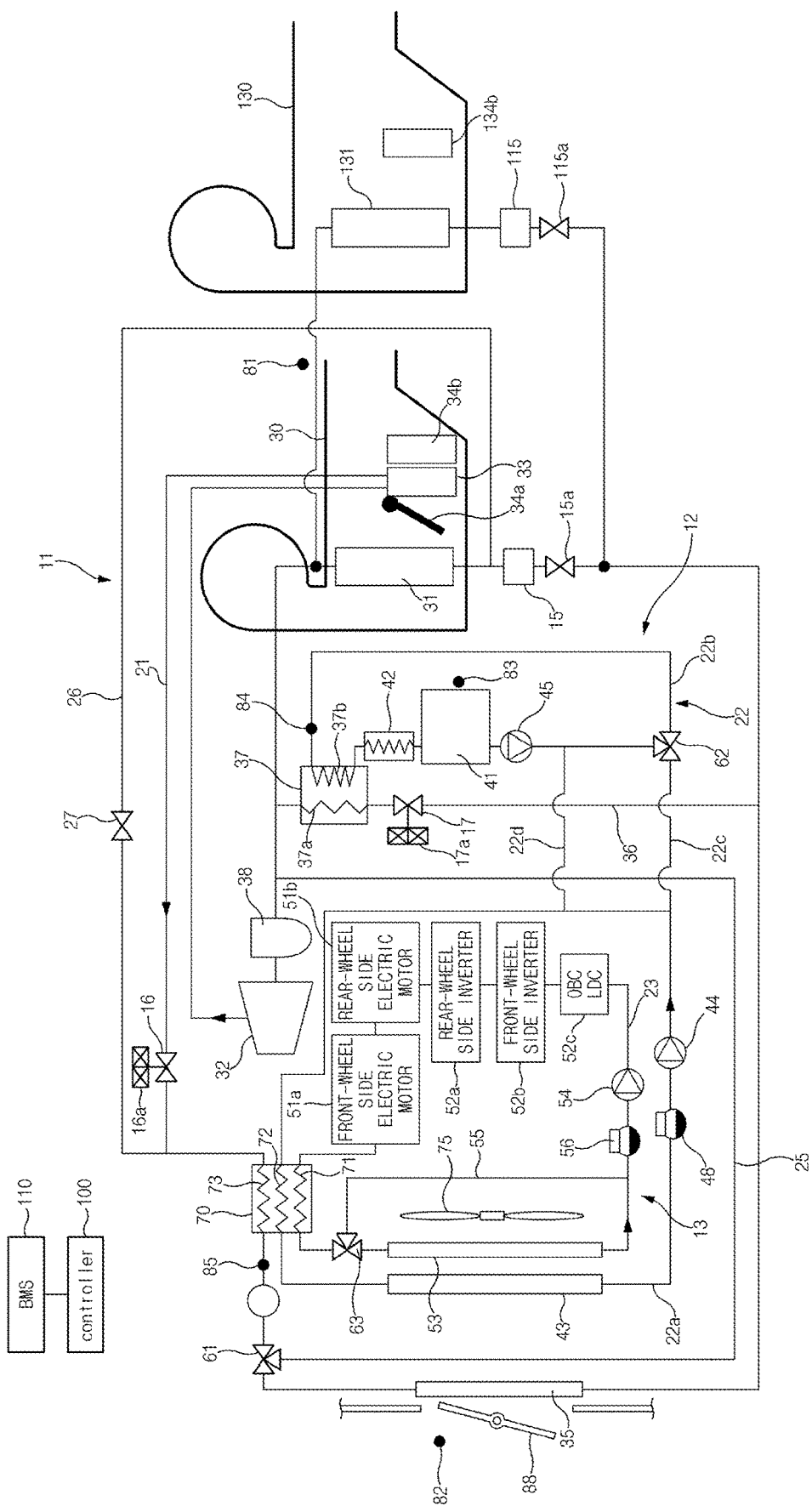
FIG. 1 illustrates a vehicle thermal management system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system according to an exemplary embodiment of the present disclosure may include a heating, ventilation, and air conditioning (HVAC) subsystem 11 including a refrigerant loop 21 through which a refrigerant circulates, a battery cooling subsystem 12 including a battery coolant loop 22 through which a battery-side coolant for cooling a battery 41 circulates, and a powertrain cooling subsystem 13 including a powertrain coolant loop 23 through which a coolant for cooling electric motors 51a and 51b and electric/electronic components 52a, 52b, and 52c of a powertrain circulates.

The HVAC subsystem 11 may be configured to heat or cool air in a passenger compartment of the vehicle using the refrigerant circulating in the refrigerant loop 21. The refrigerant loop 21 may be fluidly connected to an evaporator 31, a compressor 32, an internal condenser 33, a heating-side expansion valve 16, a water-cooled heat exchanger 70, an external heat exchanger 35, and a cooling-side expansion valve 15. In FIG. 1, the refrigerant may sequentially pass through the compressor 32, the internal condenser 33, the heating-side expansion valve 16, the water-cooled heat exchanger 70, the external heat exchanger 35, the cooling-side expansion valve 15, and the evaporator 31 through the refrigerant loop 21.

The evaporator 31 may be configured to evaporate the refrigerant received from the cooling-side expansion valve 15. That is, the refrigerant expanded by the cooling-side expansion valve 15 may absorb heat from the air and be evaporated in the evaporator 31. During a cooling operation of the HVAC subsystem 11, the evaporator 31 may be configured to cool the air using the refrigerant cooled by the external heat exchanger 35 and expanded by the cooling-side expansion valve 15, and the air cooled by the evaporator 31 may be directed into the passenger compartment.

The compressor 32 may be configured to compress the refrigerant received from the evaporator 31 and/or a battery chiller 37. According to an exemplary embodiment of the present disclosure, the compressor 32 may be an electric compressor which is driven by electrical energy.

The internal condenser 33 may be configured to condense the refrigerant received from the compressor 32. That is, the refrigerant compressed by the compressor 32 may transfer heat to the air and be condensed in the internal condenser 33. Accordingly, the internal condenser 33 may heat the air using the refrigerant compressed by the compressor 32, and the air heated by the internal condenser 33 may be directed into the passenger compartment.

The external heat exchanger 35 may be disposed adjacent to a front grille of the vehicle. Because the external heat exchanger 35 is exposed to the outside, heat may be transferred between the external heat exchanger 35 and the ambient air. During the cooling operation of the HVAC subsystem 11, the external heat exchanger 35 may be configured to condense the refrigerant received from the internal condenser 33. That is, the external heat exchanger 35 is configured as an external condenser that condenses the refrigerant by transferring heat to the ambient air during the cooling operation of the HVAC subsystem 11. During a heating operation of the HVAC subsystem 11, the external heat exchanger 35 may be configured to evaporate the refrigerant received from the water-cooled heat exchanger 70. That is, the external heat exchanger 35 is configured as an external evaporator that evaporates the refrigerant by absorbing heat from the ambient air during the heating operation of the HVAC subsystem 11. The external heat exchanger 35 may exchange heat with the ambient air forcibly blown by a cooling fan 75 so that a heat transfer rate between the external heat exchanger 35 and the ambient air may be further increased.

The water-cooled heat exchanger 70 may transfer heat among the refrigerant loop 21 of the HVAC subsystem 11, the battery coolant loop 22 of the battery cooling subsystem 12, and the powertrain coolant loop 23 of the powertrain cooling subsystem 13. The water-cooled heat exchanger 70 may be disposed between the internal condenser 33 and the external heat exchanger 35 in the refrigerant loop 21. The water-cooled heat exchanger 70 may include a first passage 71 fluidly connected to the powertrain coolant loop 23, a second passage 72 fluidly connected to the battery coolant loop 22, and a third passage 73 fluidly connected to the refrigerant loop 21.

During the heating operation of the HVAC subsystem 11, the water-cooled heat exchanger 70 may be configured to evaporate the refrigerant which is received from the internal condenser 33 using heat which is received from the powertrain cooling subsystem 13. That is, during the heating operation of the HVAC subsystem 11, the water-cooled heat exchanger 70 is configured as an evaporator that evaporates the refrigerant by recovering waste heat from the electric motors 51*a* and 51*b* and the electric/electronic components 52*a*, 52*b*, and 52*c* of the powertrain cooling subsystem 13.

During the cooling operation of the HVAC subsystem 11, the water-cooled heat exchanger 70 may be configured to condense the refrigerant received from the internal condenser 33. The water-cooled heat exchanger 70 is configured as a condenser that condenses the refrigerant by cooling the refrigerant using the battery-side coolant circulating in the battery coolant loop 22 of the battery cooling subsystem 12 and the powertrain-side coolant circulating in the powertrain coolant loop 23 of the powertrain cooling subsystem 13.

The heating-side expansion valve 16 may be located on the upstream side of the water-cooled heat exchanger 70 in the refrigerant loop 21. The heating-side expansion valve 16 may be disposed between the internal condenser 33 and the water-cooled heat exchanger 70. During the heating operation the HVAC subsystem 11, the heating-side expansion valve 16 may adjust the flow direction, flow rate, and the like of the refrigerant directed toward the water-cooled heat exchanger 70. The heating-side expansion valve 16 may be configured to expand the refrigerant received from the internal condenser 33 during the heating operation the HVAC subsystem 11.

According to an exemplary embodiment of the present disclosure, the heating-side expansion valve 16 may be an electronic expansion valve (EXV) including a drive motor 16*a*. The drive motor 16*a* may have a shaft which is movable to open or close an orifice defined in a valve body of the heating-side expansion valve 16, and the position of the shaft may be varied depending on the rotation direction, rotation degree, and the like of the drive motor 16*a*, and thus the opening amount of the heating-side expansion valve 16 with respect to the orifice may be varied. A controller 100 may control the operation of the drive motor 16*a*. The heating-side expansion valve 16 may be a full open type EXV. When the HVAC subsystem 11 does not operate in the heating mode, the heating-side expansion valve 16 may be fully opened so that the refrigerant may pass through the heating-side expansion valve 16. Thus, the expansion of the refrigerant may be stopped by the heating-side expansion valve 16.

The opening amount of the heating-side expansion valve 16 may be varied by the controller 100. As the opening amount of the heating-side expansion valve 16 is varied, the flow rate of the refrigerant directed toward the third passage 73 may be varied. The heating-side expansion valve 16 may be controlled by the controller 100 during the heating operation of the HVAC subsystem 11. The cooling-side expansion valve 15 may be disposed between the external heat exchanger 35 and the evaporator 31 in the refrigerant loop 21. As the cooling-side expansion valve 15 is located on the upstream side of the evaporator 31, it may adjust the flow direction, flow rate, and the like of the refrigerant directed toward the evaporator 31. During the cooling operation of the HVAC subsystem 11, the cooling-side expansion valve 15 may be configured to expand the refrigerant received from the external heat exchanger 35.

According to an exemplary embodiment of the present disclosure, the cooling-side expansion valve 15 may be a thermal expansion valve (TXV) which detects the temperature and/or pressure of the refrigerant and adjusts the opening amount of the cooling-side expansion valve 15. The cooling-side expansion valve 15 may be a TXV including a shut-off valve 15*a* selectively blocking the flow of the refrigerant toward an internal passage of the cooling-side expansion valve 15, and the shut-off valve 15*a* may be a solenoid valve. The shut-off valve 15*a* may be opened or closed by the controller 100, blocking or unblocking the flow of the refrigerant toward the cooling-side expansion valve 15. As the shut-off valve 15*a* is opened, the refrigerant may be allowed to flow into the cooling-side expansion valve 15, and as the shut-off valve 15*a* is closed, the refrigerant may be blocked from flowing into the cooling-side expansion valve 15. According to an exemplary embodiment of the present disclosure, the shut-off valve 15*a* may be mounted in the inside of a valve body of the cooling-side expansion valve 15, opening or closing the internal passage of the cooling-side expansion valve 15. According to another exemplary embodiment of the present disclosure, the shut-off valve 15*a* may be located on the upstream side of the cooling-side expansion valve 15, selectively opening or closing an inlet of the cooling-side expansion valve 15.

When the shut-off valve 15*a* is closed, the cooling-side expansion valve 15 may be blocked, and accordingly the refrigerant may only be directed into the battery chiller 37 without flowing into the cooling-side expansion valve 15 and the evaporator 31. That is, when the shut-off valve 15*a* of the cooling-side expansion valve 15 is closed, the cooling operation of the HVAC subsystem 11 may not be performed, but only the battery chiller 37 may be cooled or the heating operation of the HVAC subsystem 11 may be performed. When the shut-off valve 15*a* is opened, the refrigerant may be directed into the cooling-side expansion valve 15 and the evaporator 31. That is, when the shut-off valve 15*a* of the cooling-side expansion valve 15 is opened, the cooling operation of the HVAC subsystem 11 may be performed.

The HVAC subsystem 11 may include a heating, ventilation, and air conditioning (HVAC) case 30 including an inlet and an outlet, and the HVAC case 30 may be mounted on a dash panel of the vehicle to face a front seat of the vehicle. The HVAC case 30 may be configured to direct the air into the passenger compartment of the vehicle. The evaporator 31 and the internal condenser 33 may be located within the HVAC case 30. An air mixing door 34*a* may be disposed between the evaporator 31 and the internal condenser 33, and a positive temperature coefficient (PTC) heater 34*b* may be located on the downstream side of the internal condenser 33.

The HVAC subsystem 11 may further include an accumulator 38 disposed between the evaporator 31 and the compressor 32 in the refrigerant loop 21, and the accumulator 38 may be located on the downstream side of the evaporator 31. The accumulator 38 may separate a liquid refrigerant from the refrigerant which is received from the evaporator 31, preventing the liquid refrigerant from being directed toward the compressor 32.

The HVAC subsystem 11 may further include a branch conduit 36 branching off from the refrigerant loop 21. The branch conduit 36 may branch off from an upstream point of the cooling-side expansion valve 15 in the refrigerant loop 21 and be connected to the compressor 32. The battery chiller 37 may be fluidly connected to the branch conduit 36, and the battery chiller 37 may be configured to transfer heat between the branch conduit 36 and the battery coolant loop 22 to be described below. That is, the battery chiller 37 may transfer heat between the refrigerant circulating in the refrigerant loop 21 of the HVAC subsystem 11 and the battery-side coolant circulating in the battery coolant loop 22 of the battery cooling subsystem 12.

The battery chiller 37 may include a first passage 37*a* fluidly connected to the branch conduit 36 and a second passage 37*b* fluidly connected to the battery coolant loop 22. The first passage 37*a* and the second passage 37*b* may be adjacent to or contact each other within the battery chiller 37, and the first passage 37*a* may be fluidly separated from the second passage 37*b*. Accordingly, the battery chiller 37 may transfer heat between the battery-side coolant passing through the second passage 37*b* and the refrigerant passing through the first passage 37*a*. The branch conduit 36 may be fluidly connected to the accumulator 38, and the refrigerant passing through the branch conduit 36 may be received in the accumulator 38.

A chiller-side expansion valve 17 may be located on the upstream side of the battery chiller 37 in the branch conduit 36. The chiller-side expansion valve 17 may adjust the flow direction, flow rate, and the like of the refrigerant directed toward the battery chiller 37, and the chiller-side expansion valve 17 may be configured to expand the refrigerant received from the external heat exchanger 35.

According to an exemplary embodiment of the present disclosure, the chiller-side expansion valve 17 may be an electronic expansion valve (EXV) including a drive motor 17*a*. The drive motor 17*a* may have a shaft which is movable to open or close an orifice defined in a valve body of the chiller-side expansion valve 17, and the position of the shaft may be varied depending on the rotation direction, rotation degree, and the like of the drive motor 17*a*, and accordingly the opening amount of the chiller-side expansion valve 17 may be varied. The controller 100 may control the operation of the drive motor 17*a*. The chiller-side expansion valve 17 may be a full open type EXV.

As the opening amount of the chiller-side expansion valve 17 is varied, the flow rate of the refrigerant directed toward the battery chiller 37 may be varied. For example, when the opening amount of the chiller-side expansion valve 17 is greater than a reference opening amount, the flow rate of the refrigerant directed toward the battery chiller 37 may increase compared to a reference flow rate, and when the opening amount of the chiller-side expansion valve 17 is less than the reference opening amount, the flow rate of the refrigerant directed toward the battery chiller 37 may be similar to the reference flow rate or decrease compared to the reference flow rate. Here, the reference opening amount may be an opening amount of the chiller-side expansion valve 17 for maintaining a target evaporator temperature, and the reference flow rate may be a flow rate of the refrigerant directed toward the battery chiller 37 when the chiller-side expansion valve 17 is opened to the reference opening amount. When the chiller-side expansion valve 17 is opened to the reference opening amount, the refrigerant may be directed toward the battery chiller 37 at the corresponding reference flow rate.

As the opening amount of the cooling-side expansion valve 15 and the opening amount of the chiller-side expansion valve 17 are adjusted by the controller 100, the refrigerant may be distributed into the evaporator 31 and the battery chiller 37 at a predetermined rate, and thus the cooling of the HVAC subsystem 11 and the cooling of the battery chiller 37 may be performed simultaneously or selectively.

The HVAC subsystem 11 may further include a first refrigerant bypass conduit 25 connecting a downstream point of the third passage 73 of the water-cooled heat exchanger 70 and the branch conduit 36. An inlet of the first refrigerant bypass conduit 25 may be connected to the downstream point of the water-cooled heat exchanger 70, and an outlet of the first refrigerant bypass conduit 25 may be connected to the branch conduit 36. The inlet of the first refrigerant bypass conduit 25 may be connected to a point between the water-cooled heat exchanger 70 and the external heat exchanger 35, and the outlet of the first refrigerant bypass conduit 25 may be connected to a point between the battery chiller 37 and the compressor 32 in the branch conduit 36. A first three-way valve 61 may be disposed at a junction between the inlet of the first refrigerant bypass conduit 25 and the refrigerant loop 21. The first three-way valve 61 may be disposed between the external heat exchanger 35 and the water-cooled heat exchanger 70 in the refrigerant loop 21. When the first three-way valve 61 is switched to open the inlet of the first refrigerant bypass conduit 25, the refrigerant passing through the third passage 73 of the water-cooled heat exchanger 70 may be directed toward the compressor 32 through the first refrigerant bypass conduit 25 and the accumulator 38. That is, when the inlet of the first refrigerant bypass conduit 25 is opened by the switching of the first three-way valve 61, the refrigerant may bypass the external heat exchanger 35. When the first three-way valve 61 is switched to close the inlet of the first refrigerant bypass conduit 25, the refrigerant passing through the third passage 73 of the water-cooled heat exchanger 70 may not pass through the first refrigerant bypass conduit 25, and be directed toward the external heat exchanger 35. That is, when the inlet of the first refrigerant bypass conduit 25 is closed by the switching of the first three-way valve 61, the refrigerant may pass through the external heat exchanger 35.

The controller 100 may control respective operations of the shut-off valve 15*a* of the cooling-side expansion valve 15, the heating-side expansion valve 16, the chiller-side expansion valve 17, the compressor 32, and the like so that the overall operation of the HVAC subsystem 11 may be controlled by the controller 100. According to an exemplary embodiment of the present disclosure, the controller 100 may be a full automatic temperature control (FATC) system.

When the HVAC subsystem 11 operates in the cooling mode, the shut-off valve 15*a* of the cooling-side expansion valve 15 may be opened, and the refrigerant may sequentially circulate through the compressor 32, the internal condenser 33, the heating-side expansion valve 16, the third passage 73 of the water-cooled heat exchanger 70, the external heat exchanger 35, the cooling-side expansion valve 15, and the evaporator 31.

When the HVAC subsystem 11 operates in the heating mode, the shut-off valve 15*a* of the cooling-side expansion valve 15 may be closed, and the refrigerant may sequentially circulate through the compressor 32, the internal condenser 33, the heating-side expansion valve 16, the third passage 73 of the water-cooled heat exchanger 70, the external heat exchanger 35, the chiller-side expansion valve 17, the first passage 37*a* of the battery chiller 37, and the compressor 32. During the heating operation of the HVAC subsystem 11, when the shut-off valve 15*a* of the cooling-side expansion valve 15 is closed, and the inlet of the first refrigerant bypass conduit 25 is opened by the switching of the first three-way valve 61, the refrigerant may sequentially circulate through the compressor 32, the internal condenser 33, the heating-side expansion valve 16, the third passage 73 of the water-cooled heat exchanger 70, and the compressor 32.

The HVAC subsystem 11 according to an exemplary embodiment of the present disclosure may further include a branch conduit 26 branching off from the refrigerant loop 21. The branch conduit 26 may branch off from a point between the heating-side expansion valve 16 and the water-cooled heat exchanger 70 in the refrigerant loop 21, and the branch conduit 26 may extend to the upstream point of the cooling-side expansion valve 15. A shut-off valve 27 may be provided to open or close the branch conduit 26. When dehumidification of the passenger compartment is required during the heating operation of the HVAC subsystem 11, the shut-off valve 27 may be opened so that a portion of the refrigerant flowing from the heating-side expansion valve 16 toward the water-cooled heat exchanger 70 may be directed toward the evaporator 31 through the branch conduit 26. Accordingly, the refrigerant directed toward the evaporator 31 may absorb heat from the air having passed through the evaporator 31, and thus the heating and dehumidification of the passenger compartment may be performed simultaneously.

The HVAC subsystem 11 according to an exemplary embodiment of the present disclosure may further include a rear HVAC case 130 facing a rear seat of the vehicle. The rear HVAC case 130 may include a rear evaporator 131 and a rear PTC heater 134*b* disposed therein. The rear evaporator 131 may be fluidly parallel-connected to the evaporator 31, and the rear PTC heater 134*b* may be located on the downstream side of the rear evaporator 131 in the air flow direction. A rear cooling-side expansion valve 115 and a rear shut-off valve 115*a* may be fluidly connected to the rear evaporator 131.

The battery cooling subsystem 12 may be configured to increase or decrease the temperature of the battery 41 using the battery-side coolant circulating in the battery coolant loop 22. The battery coolant loop 22 may be fluidly connected to a battery radiator 43, a reservoir tank 48, a first battery-side pump 44, the battery chiller 37, a heater 42, the battery 41, a second battery-side pump 45, and the water-cooled heat exchanger 70. In FIG. 1, the battery-side coolant may sequentially pass through the battery radiator 43, the reservoir tank 48, the first battery-side pump 44, the battery chiller 37, the heater 42, the battery 41, the second battery-side pump 45, and the water-cooled heat exchanger 70 through the battery coolant loop 22.

The battery 41 may have a coolant passage through which the battery-side coolant passes inside or outside the battery 41, and the battery coolant loop 22 may be fluidly connected to the coolant passage of the battery 41.

The heater 42 may be disposed between the battery chiller 37 and the battery 41, and the heater 42 may heat the battery-side coolant circulating through the battery coolant loop 22, warming-up the coolant. According to an exemplary embodiment of the present disclosure, the heater 42 may be an electric heater. According to another exemplary embodiment of the present disclosure, the heater 42 may be a heater that heats the battery-side coolant by exchanging heat with a high-temperature fluid.

The battery radiator 43 may be disposed adjacent to the front grille of the vehicle, and the battery radiator 43 may be cooled by the ambient air forcibly blown by the cooling fan 75. The battery radiator 43 may be adjacent to the external heat exchanger 35.

The first battery-side pump 44 may allow the battery-side coolant to circulate through at least a portion of the battery coolant loop 22, and the second battery-side pump 45 may allow the battery-side coolant to circulate through at least a portion of the battery coolant loop 22.

The reservoir tank 48 may be disposed between an outlet of the battery radiator 43 and an inlet of the first battery-side pump 44.

According to an exemplary embodiment of the present disclosure, the battery coolant loop 22 may include a first coolant conduit 22a and a second coolant conduit 22b connected through a first connection conduit 22c and a second connection conduit 22d. The first coolant conduit 22a may be fluidly connected to the battery radiator 43, the reservoir tank 48, the first battery-side pump 44, and the water-cooled heat exchanger 70, and the second coolant conduit 22b may be fluidly connected to the battery chiller 37, the heater 42, the battery 41, and the second battery-side pump 45.

The first connection conduit 22c may connect a downstream point of the first battery-side pump 44 and an upstream point of the second passage 37b of the battery chiller 37. An inlet of the first connection conduit 22c may be connected to the downstream point of the first battery-side pump 44, and an outlet of the first connection conduit 22c may be connected to the upstream point of the second passage 37b of the battery chiller 37.

The second connection conduit 22d may connect a downstream point of the second battery-side pump 45 and an upstream point of the second passage 72 of the water-cooled heat exchanger 70. An inlet of the second connection conduit 22d may be connected to the downstream point of the second battery-side pump 45, and an outlet of the second connection conduit 22d may be connected to the upstream point of the second passage 72 of the water-cooled heat exchanger 70.

The first battery-side pump 44 may be located on the downstream side of the battery radiator 43 in the first coolant conduit 22a of the battery coolant loop 22.

The second battery-side pump 45 may be located on the downstream side of the battery 41 in the second coolant conduit 22b of the battery coolant loop 22.

The first battery-side pump 44 and the second battery-side pump 45 may operate individually and selectively according to the heating state and charging conditions of the battery 41, the operation conditions of the HVAC subsystem 11, and/or the like.

The battery cooling subsystem 12 may further include a second three-way valve 62 mounted on at least one of the first and second connection conduits 22c and 22d.

Referring to FIG. 1, the second three-way valve 62 may be disposed at the outlet of the first connection conduit 22c. That is, the second three-way valve 62 may be disposed at a junction between the first connection conduit 22c and the second coolant conduit 22b.

When the second three-way valve 62 is switched to open the outlet of the first connection conduit 22c, the first coolant conduit 22a may be fluidly connected to the second coolant conduit 22b through the first connection conduit 22c and the second connection conduit 22d, and accordingly the battery-side coolant may circulate through the entirety of the first coolant conduit 22a and the second coolant conduit 22b.

When the second three-way valve 62 is switched to close the outlet of the first connection conduit 22c, the first coolant conduit 22a may be fluidly separated from the second coolant conduit 22b, and accordingly the battery-side coolant may circulate through the first coolant conduit 22a and the second coolant conduit 22b in an independent manner. In a state in which the second three-way valve 62 is switched to close the outlet of the first connection conduit 22c, a portion of the battery-side coolant may circulate through the first coolant conduit 22a by the first battery-side pump 44 so that it may pass through the battery radiator 43, the reservoir tank 48, and the second passage 72 of the water-cooled heat exchanger 70 sequentially, and the remaining portion of the battery-side coolant may circulate through the second coolant conduit 22b by the second battery-side pump 45 so that it may pass through the second passage 37b of the battery chiller 37, the heater 42, and the battery 41 sequentially.

The battery cooling subsystem 12 may be controlled by a battery management system 110. The battery management system 110 may monitor the state of the battery 41, and perform the cooling of the battery 41 when the temperature of the battery 41 is higher than or equal to a predetermined temperature. The battery management system 110 may transmit an instruction for the cooling of the battery 41 to the controller 100, and accordingly the controller 100 may control the compressor 32 to operate and control the chiller-side expansion valve 17 to open. When the operation of the HVAC subsystem 11 is not required during the cooling operation of the battery 41, the controller 100 may control the cooling-side expansion valve 15 to close. Furthermore, the battery management system 110 may control the operation of the first battery-side pump 44, the operation of the second battery-side pump 45, and the switching of the second three-way valve 62 as necessary, so that the battery-side coolant may selectively flow through the first coolant conduit 22a and the second coolant conduit 22b.

The powertrain cooling subsystem 13 may be configured to cool the electric motors 51a and 51b and the electric/electronic components 52a, 52b, and 52c of the powertrain using the powertrain-side coolant circulating through the powertrain coolant loop 23. The powertrain coolant loop 23 may be fluidly connected to a powertrain radiator 53, a reservoir tank 56, a powertrain-side pump 54, the electric/electronic components 52a, 52b, and 52c, the electric motors 51a and 51b, and the first passage 71 of the water-cooled heat exchanger 70. Referring to FIG. 1, the powertrain-side coolant may sequentially pass through the powertrain radiator 53, the reservoir tank 56, the powertrain-side pump 54, the electric/electronic components 52a, 52b, and 52c, the electric motors 51a and 51b, and the first passage 71 of the water-cooled heat exchanger 70 through the powertrain coolant loop 23.

Each of the electric motors 51a and 51b may have a coolant passage through which the powertrain-side coolant passes inside or outside the electric motors 51a and 51b, and the powertrain coolant loop 23 may be fluidly connected to the coolant passages of the electric motors 51a and 51b. Referring to FIG. 1, the electric motors 51a and 51b may include a front-wheel side electric motor 51a and a rear-wheel side electric motor 51b.

The electric/electronic components 52a, 52b, and 52c may be one or more electric/electronic components related to the driving of the electric motors 51a and 51b. Each of the electric/electronic components 52a, 52b, and 52c may have a coolant passage through which the powertrain-side coolant passes inside or outside electric/electronic components, and the powertrain coolant loop 23 may be fluidly connected to the coolant passages of the electric/electronic components 52a, 52b, and 52c. Referring to FIG. 1, the electric/electronic components 52a, 52b, and 52c may include a rear-wheel side inverter 52a, a front-wheel side inverter 52b, and an on-board charger (OBC)/low DC-DC converter (LDC) 52c.

The powertrain radiator 53 may be disposed adjacent to the front grille of the vehicle, and the powertrain radiator 53 may be cooled by the ambient air forcibly blown by the cooling fan 75. The external heat exchanger 35, the battery radiator 43, and the powertrain radiator 53 may be disposed adjacent to each other on the front of the vehicle, and accordingly the external heat exchanger 35, the battery radiator 43, and the powertrain radiator 53 may contact with the ambient air and exchange heat with the ambient air. The cooling fan 75 may be disposed behind the external heat exchanger 35, the battery radiator 43, and the powertrain radiator 53. An active air flap 88 may open or close the front grille of the vehicle. As the active air flap 88 is opened, the ambient air may directly contact with the external heat exchanger 35, the battery radiator 43, and the powertrain radiator 53 through the front grille of the vehicle so that the external heat exchanger 35, the battery radiator 43, and the powertrain radiator 53 may directly exchange heat with the ambient air.

The reservoir tank 56 may be located on the downstream side of the powertrain radiator 53. The reservoir tank 56 may be disposed between an outlet of the powertrain radiator 53 and the powertrain-side pump 54 in the powertrain coolant loop 23.

The powertrain-side pump 54 may be located on the upstream side of the electric motors 51a and 51b and the electric/electronic components 52a, 52b, and 52c, and the powertrain-side pump 54 may be configured to circulate the coolant in the powertrain coolant loop 23.

The powertrain cooling subsystem 13 may further include a powertrain bypass conduit 55 allowing the coolant to bypass the powertrain radiator 53. The powertrain bypass conduit 55 may directly connect an upstream point of the powertrain radiator 53 and a downstream point of the powertrain radiator 53 in the powertrain coolant loop 23 so that the powertrain-side coolant may bypass the powertrain radiator 53 through the powertrain bypass conduit 55.

An inlet of the powertrain bypass conduit 55 may be connected to a point between an inlet of the powertrain radiator 53 and the electric motors 51a and 51b in the powertrain coolant loop 23. The inlet of the powertrain bypass conduit 55 may be connected to a point between the inlet of the powertrain radiator 53 and the first passage 71 of the water-cooled heat exchanger 70. An outlet of the powertrain bypass conduit 55 may be connected to a point between the outlet of the powertrain radiator 53 and the reservoir tank 56 in the powertrain coolant loop 23.

The powertrain cooling subsystem 13 may further include a third three-way valve 63 disposed at the inlet of the powertrain bypass conduit 55. When the third three-way valve 63 is switched to open the inlet of the powertrain bypass conduit 55, the powertrain-side coolant may pass through the powertrain bypass conduit 55 so that it may bypass the powertrain radiator 53, and thus the powertrain-side coolant may sequentially circulate through the first passage 71 of the water-cooled heat exchanger 70, the powertrain bypass conduit 55, the reservoir tank 56, the powertrain-side pump 54, the electric/electronic components 52a, 52b, and 52c, and the electric motors 51a and 51b. When the third three-way valve 63 is switched to close the inlet of the powertrain bypass conduit 55, the powertrain-side coolant may not pass through the powertrain bypass conduit 55, and the powertrain-side coolant may sequentially circulate through the first passage 71 of the water-cooled heat exchanger 70, the powertrain radiator 53, the reservoir tank 56, the powertrain-side pump 54, the electric/electronic components 52a, 52b, and 52c, and the electric motors 51a and 51b.

The switching of the third three-way valve 63 and the operation of the powertrain-side pump 54 may be controlled by the controller 100.

Heat rejection from the powertrain components such as the electric motors 51a and 51b and the electric/electronic components 52a, 52b, and 52c, and the battery 41 may relatively increase when the vehicle travels a predetermined distance or the battery is charged.

The vehicle thermal management system according to an exemplary embodiment of the present disclosure may include an internal temperature sensor 81 measuring an internal temperature of the vehicle, an external temperature sensor or ambient temperature sensor 82 measuring an ambient temperature of the vehicle, a battery temperature sensor 83 measuring a temperature of the battery 41, a coolant temperature sensor 84 measuring a temperature of the battery-side coolant, and a refrigerant temperature sensor 85 measuring a temperature of the refrigerant.

The internal temperature sensor 81 may be disposed in the passenger compartment to measure the internal temperature in real time. The internal temperature measured by the internal temperature sensor 81 may be used for optimal control of the HVAC subsystem 11.

The ambient temperature sensor 82 may be disposed adjacent to the front grille of the vehicle to measure the ambient temperature of the vehicle, and the ambient temperature measured by the ambient temperature sensor 82 may be used for optimal control of the HVAC subsystem 11.

The battery temperature sensor 83 may be mounted on the battery 41 to measure the temperature of the battery 41, and the temperature of the battery 41 measured by the battery temperature sensor 83 may be used for optimal control of the battery cooling sub system 12.

The coolant temperature sensor 84 may be disposed on the upstream side of the battery chiller 37 along the flow direction of the battery-side coolant in the battery coolant loop 22. Thus, the coolant temperature sensor 84 may measure the temperature of the battery-side coolant at the upstream point of the battery chiller 37.

The refrigerant temperature sensor 85 may be disposed between the water-cooled heat exchanger 70 and the first three-way valve 61 along the flow direction of the refrigerant in the refrigerant loop 21. Thus, the refrigerant temperature sensor 85 may measure the temperature of the refrigerant at the upstream point of the battery chiller 37 and an upstream point of the compressor 32.

The controller 100 may properly control the operations of the HVAC subsystem 11, the battery cooling subsystem 12, and the powertrain cooling subsystem 13 using the internal temperature sensor 81, the ambient temperature sensor 82, the battery temperature sensor 83, the coolant temperature sensor 84, and the refrigerant temperature sensor 85.

Figure 2:
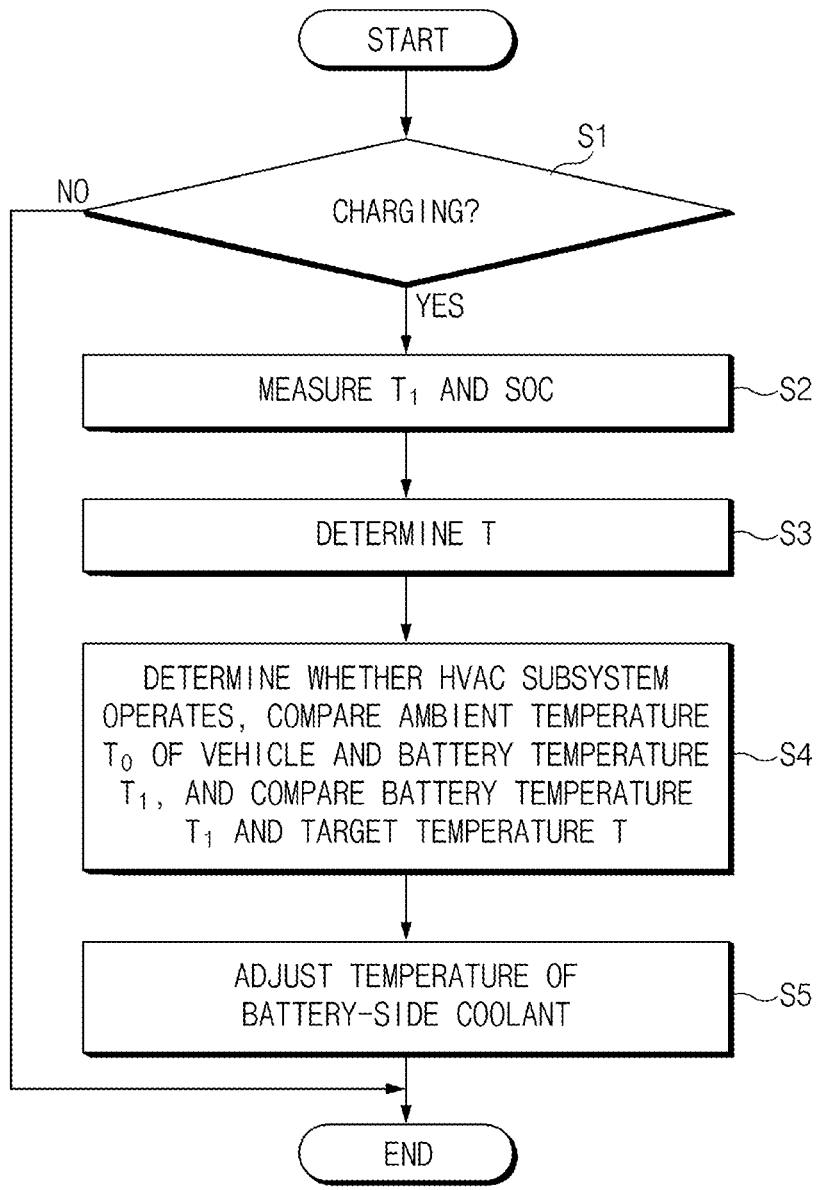
FIG. 2 illustrates a flowchart of a method for controlling a temperature of a vehicle battery according to an exemplary embodiment of the present disclosure.

FIG. 2 illustrates a flowchart of a method for controlling a temperature of a vehicle battery according to an exemplary embodiment of the present disclosure.

Referring to FIG. 2, it may be determined whether the battery 41 is to be charged (S1). It may be determined whether the battery 41 is to be charged or not by detecting whether a charging station is designated as a destination in a navigation system or whether a charging port is opened. That is, when a user (or an occupant) designates the charging station as the destination in the navigation system or opens the charging port, the controller 100 may determine that the charging of the battery 41 is to be performed.

When it is determined in S1 that the charging of the battery 41 is to be performed, a battery temperature $T_1$ may be measured by the battery temperature sensor 83, and a state of charge (SOC) value of the battery 41 may be measured or predicted by the battery management system 110 (S2).

A target temperature T optimized for normal charging or fast charging of the battery 41 may be determined based on the measured SOC and the measured battery temperature $T_1$ (S3). The target temperature T may be defined as a target temperature point or a target temperature range based on the SOC and the battery temperature. The relationships of the SOC, the battery temperature $T_1$, and the target temperature T may be established in a lookup table through various tests. The lookup table may provide target temperatures T corresponding to provided SOCs and battery temperatures $T_1$, and the lookup table may be stored in a memory of the controller 100. For example, when the SOC is 10-50% and the battery temperature $T_1$ is 28° C., the target temperature T may be 30° C. (target temperature point) or 25-35° C. (target temperature range).

It may be determined whether the HVAC subsystem 11 operates. An ambient temperature $T_O$ of the vehicle and the battery temperature $T_1$ may be compared, and the battery temperature $T_1$ and the target temperature T may be compared (S4).

The controller 100 may selectively control the HVAC subsystem 11 and the battery cooling subsystem 12 according to whether the HVAC subsystem 11 operates, the result of comparing the ambient temperature $T_O$ and the battery temperature $T_1$, and the result of comparing the battery temperature $T_1$ and the target temperature T, so that the battery temperature may be controlled by adjusting a temperature of the battery-side coolant circulating in the battery coolant loop 22 (S5).

Figure 3:
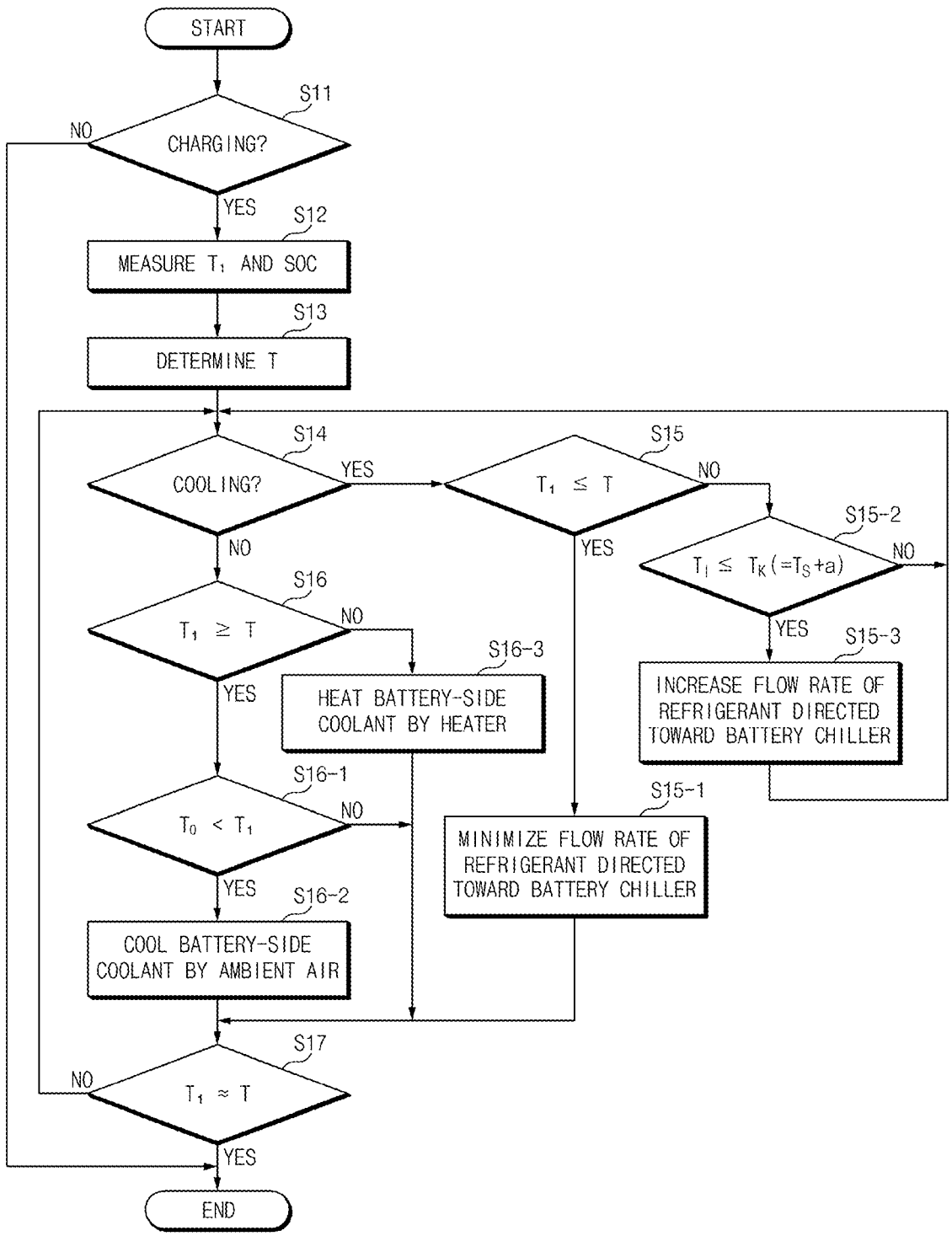
FIG. 3 illustrates a flowchart of a method for controlling a temperature of a vehicle battery according to an exemplary embodiment of the present disclosure, including determining whether a passenger compartment is cooled.

FIG. 3 illustrates a flowchart of a method for controlling a temperature of a vehicle battery according to an exemplary embodiment of the present disclosure, including determining whether a passenger compartment is cooled. For example, during the charging of the vehicle battery in a condition in which the ambient temperature of the vehicle is higher than a predetermined reference temperature such as in summer, the controller 100 may selectively control the operation of the HVAC subsystem 11 and the operation of the battery cooling subsystem 12 according to whether the HVAC subsystem 11 operates in a cooling mode, the result of comparing an ambient temperature $T_O$ and a battery temperature $T_1$, and the result of comparing the battery temperature $T_1$ and a target temperature T, adjusting a temperature of the battery-side coolant circulating in the battery coolant loop 22.

Referring to FIG. 3, it may be determined whether the charging of the battery 41 is to be performed (S11). It may be determined whether the charging of the battery 41 is to be performed by detecting whether the charging port is opened.

When it is determined in S11 that the charging of the battery 41 is to be performed, a battery temperature $T_1$ may be measured by the battery temperature sensor 83, and SOC value of the battery 41 may be measured or predicted by the battery management system 110 (S12).

A target temperature T optimized for normal charging or fast charging of the battery 41 may be determined based on the measured battery temperature $T_1$ and the measured SOC value of the battery 41 (S13).

It may be determined whether the HVAC subsystem 11 operates in the cooling mode (S14).

When it is determined in S14 that the HVAC subsystem 11 operates in the cooling mode, it may be determined whether the battery temperature $T_1$ is equal to or less than the target temperature T ($T_1 \leq T$) (S15).

When it is determined in S15 that the battery temperature $T_1$ is equal to or less than the target temperature T ($T_1 \leq T$), the refrigerant may be blocked from being directed toward the battery chiller 37 or the flow rate of the refrigerant directed toward the battery chiller 37 may be minimized (S15-1).

According to an exemplary embodiment of the present disclosure, when the chiller-side expansion valve 17 is fully closed, the flow of the refrigerant toward the battery chiller 37 may be blocked, and the flow rate of the refrigerant directed toward the evaporator 31 may relatively increase so that the cooling performance achieved by the evaporator 31 may be maximized.

According to another exemplary embodiment of the present disclosure, by adjusting the opening amount of the chiller-side expansion valve 17 to a minimum opening amount, the flow rate of the refrigerant directed toward the battery chiller 37 may be adjusted to a minimum flow rate. The minimum flow rate may be a flow rate at which the cooling performance of the battery-side coolant cooled by the battery chiller 37 is minimized. As the minimum opening amount of the chiller-side expansion valve 17 is maintained, the flow rate of the refrigerant directed toward the evaporator 31 through the cooling-side expansion valve 15 may relatively increase, and thus the cooling performance achieved by the evaporator 31 may be improved.

When the refrigerant is not directed toward the battery chiller 37 or the flow rate of the refrigerant directed toward the battery chiller 37 is maintained at the minimum flow rate, the battery cooling performance achieved by the battery chiller 37 may be minimized. Thereafter, it may be determined whether the battery temperature $T_1$ is substantially the same as the target temperature T (S17). It may be determined whether the battery temperature $T_1$ is the same as or similar to the target temperature. When it is determined that the battery temperature $T_1$ is substantially the same as the target temperature T, the controller 100 may determine that the battery temperature $T_1$ has reached the target temperature T optimized for the charging of the battery 41.

When it is determined in S15 that the battery temperature $T_1$ exceeds the target temperature T ($T_1 > T$), it may be determined whether an internal temperature $T_I$ of the vehicle is equal to or less than a corrected temperature $T_K$ required for cooling the passenger compartment of the vehicle (S15-2). The corrected temperature $T_K$ may be obtained by adding a correction value a to a temperature $T_s$ required for cooling the passenger compartment of the vehicle directly set by the user ($T_K = T_S + a$). That is, the corrected temperature $T_K$ required for cooling the passenger compartment may be increased by the correction value a above the user's set temperature $T_s$ required for cooling the passenger compartment. By comparing the internal temperature $T_I$ of the vehicle with the corrected temperature $T_K$ required for cooling the passenger compartment, the flow rate of the refrigerant directed toward the battery chiller 37 may be adjusted, and thus the temperature of the battery-side coolant may be adjusted.

When it is determined in S15-2 that the internal temperature $T_I$ of the vehicle is equal to or less than the corrected temperature $T_K$ required for cooling the passenger compartment, the flow rate of the refrigerant directed toward the battery chiller 37 may be relatively increased above the minimum flow rate (S15-3). According to an exemplary embodiment of the present disclosure, by increasing the opening amount of the chiller-side expansion valve 17 above the minimum opening amount by a predetermined value, the flow rate of the refrigerant directed toward the battery chiller 37 may be relatively increased above the minimum flow rate. As the opening amount of the chiller-side expansion valve 17 is relatively increased above the minimum opening amount, the flow rate of the refrigerant directed toward the evaporator 31 through the cooling-side expansion valve 15 may relatively decrease. Accordingly, the cooling performance achieved by the evaporator 31 may be relatively reduced, and thus the cooling performance with respect to the passenger compartment of the vehicle may be sacrificed. According to another exemplary embodiment of the present disclosure, by increasing the opening amount of the chiller-side expansion valve 17 based on a difference between the internal temperature $T_I$ and the corrected temperature $T_K$, the flow rate of the refrigerant directed toward the battery chiller 37 may be relatively increased. After S15-3, the method may return to S14.

When it is determined in S15-2 that the internal temperature $T_I$ of the vehicle is higher than the corrected temperature $T_K$ required for cooling the passenger compartment, the method may return to S14.

As described above, in the conditions in which the ambient temperature of the vehicle is relatively high and the HVAC subsystem 11 operates in the cooling mode, the flow rate of the refrigerant directed toward the battery chiller 37 may vary depending on the result of comparing the battery temperature $T_1$ and the target temperature T, so that the temperature of the battery-side coolant and the battery temperature $T_1$ may be adjusted.

When it is determined in S14 that the HVAC subsystem 11 does not operate in the cooling mode, it may be determined whether the battery temperature $T_1$ is higher than or equal to the target temperature T ($T_1 \geq T$) (S16).

When it is determined in S16 that the battery temperature $T_1$ is higher than or equal to the target temperature T ($T_1 \geq T$), it may be determined whether an ambient temperature $T_O$ of the vehicle is lower than the battery temperature $T_1$ ($T_O < T_1$) (S16-1).

When it is determined in S16-1 that the ambient temperature $T_O$ of the vehicle is lower than the battery temperature T1 ($T_O < T_1$), the battery-side coolant may be cooled by the ambient air by simultaneously operating the cooling fan 75 and operating the first battery-side pump 44 and the second battery-side pump 45 of the battery cooling subsystem 12 (S16-2). As the battery-side coolant exchanges heat with the ambient air (that is, the battery-side coolant releases heat into the ambient air), the battery-side coolant may be cooled to an appropriate temperature. Furthermore, as the active air flap 88 located in the front grille of the vehicle is opened, the ambient air may directly contact with the battery radiator 43, and thus the cooling performance of the battery-side coolant may be further improved. Considering that the vehicle is usually parked in an indoor space such as a charging station or a parking lot during the charging of the vehicle battery in the condition in which the ambient temperature of the vehicle is relatively high such as in summer, the ambient temperature $T_O$ may be relatively lower when the vehicle battery is charged than when the vehicle is travelling, and accordingly the ambient temperature $T_O$ may be lower than the battery temperature $T_1$. When the vehicle is parked in the indoor space, and the ambient temperature $T_O$ is lower than the battery temperature $T_1$, the battery-side coolant may be cooled by the ambient air by appropriately utilizing the first battery-side pump 44 and the second battery-side pump 45 of the battery cooling subsystem 12, the cooling fan 75, and the like. Because the HVAC subsystem 11 does not operate, power consumption may be saved.

After S16-2, it may be determined whether the battery temperature $T_1$ is substantially the same as the target temperature T (S17). It may be determined whether the battery temperature $T_1$ is the same as or similar to the target temperature. When it is determined that the battery temperature $T_1$ is substantially the same as the target temperature T, the controller 100 may determine that the battery temperature $T_1$ has reached the target temperature T optimized for the charging of the battery 41.

When it is determined in S16-1 that the ambient temperature $T_O$ is higher than or equal to the battery temperature $T_1$ ($T_O \geq T_1$), it may be determined whether the battery temperature $T_1$ is substantially the same as the target temperature T (S17). It may be determined whether the battery temperature $T_1$ is the same as or similar to the target temperature. When it is determined that the battery temperature $T_1$ is substantially the same as the target temperature T, the controller 100 may determine that the battery temperature $T_1$ has reached the target temperature T optimized for the charging of the battery 41.

When it is determined in S16 that the battery temperature $T_1$ is lower than the target temperature T ($T_1 < T$), the battery-side coolant may be heated by operating the heater 42 of the battery cooling subsystem 12 (S16-3), and thus the temperature of the battery-side coolant may relatively increase. In the conditions in which the ambient temperature of the vehicle is relatively high and the HVAC subsystem 11 does not operate, when the battery temperature $T_1$ is lower than the target temperature T, the temperature of the battery-side coolant may be relatively increased by the heater 42 of the battery cooling subsystem 12 so that the battery temperature $T_1$ may be relatively increased.

Figure 4:
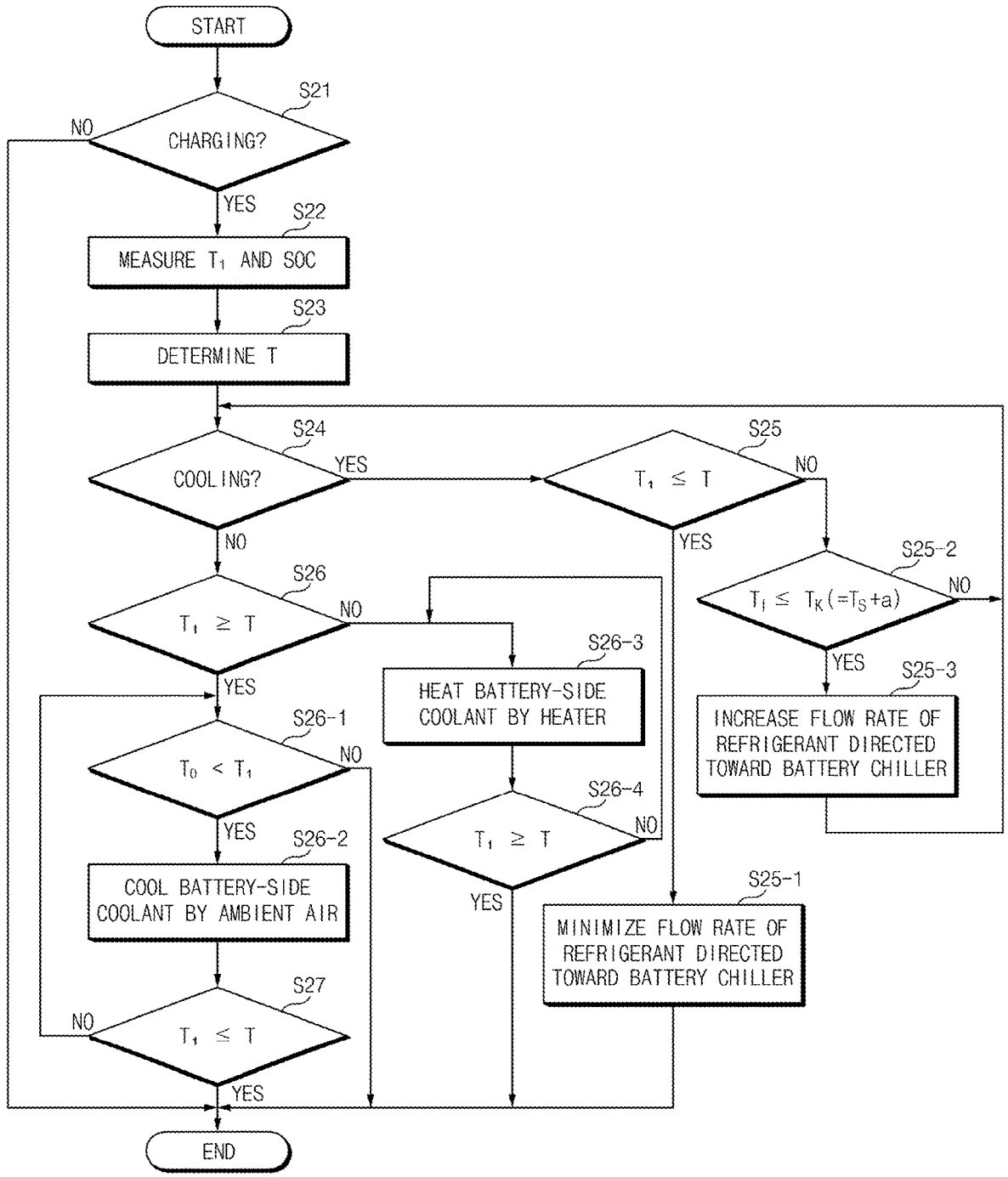
FIG. 4 illustrates a flowchart of a method for controlling a temperature of a vehicle battery according to another exemplary embodiment of the present disclosure, which is a modification to the exemplary embodiment illustrated in FIG. 3.

FIG. 4 illustrates a flowchart of a method for controlling a temperature of a vehicle battery according to another exemplary embodiment of the present disclosure, which is a modification to the exemplary embodiment illustrated in FIG. 3.

Referring to FIG. 4, it may be determined whether the charging of the battery 41 is to be performed (S21). It may be determined whether the charging of the battery 41 is to be performed by detecting whether the charging port is opened.

When it is determined in S21 that the charging of the battery 41 is to be performed, a battery temperature $T_1$ may be measured by the battery temperature sensor 83, and SOC value of the battery 41 may be measured or predicted by the battery management system 110 (S22).

A target temperature T optimized for normal charging or fast charging of the battery 41 may be determined based on the measured battery temperature $T_1$ and the measured SOC value of the battery 41 (S23).

It may be determined whether the HVAC subsystem 11 operates in a cooling mode (S24).

When it is determined in S24 that the HVAC subsystem 11 operates in the cooling mode, it may be determined whether the battery temperature $T_1$ is equal to or less than the target temperature T ($T_1 \leq T$) (S25).

When it is determined in S25 that the battery temperature $T_1$ is equal to or less than the target temperature T ($T_1 \leq T$), the flow rate of the refrigerant directed toward the battery chiller 37 may be minimized (S25-1) so that the flow rate of the refrigerant directed toward the battery chiller 37 may be maintained at a minimum flow rate. The minimum flow rate may be a flow rate at which the cooling performance of the battery-side coolant cooled by the battery chiller 37 is minimized. By adjusting the opening amount of the chiller-side expansion valve 17 to a minimum opening amount, the flow rate of the refrigerant directed toward the battery chiller 37 may be adjusted to the minimum flow rate. As the minimum opening amount of the chiller-side expansion valve 17 is maintained, the flow rate of the refrigerant directed toward the evaporator 31 through the cooling-side expansion valve 15 may relatively increase, and thus the cooling performance achieved by the evaporator 31 may be improved to the maximum.

When the flow rate of the refrigerant directed toward the battery chiller 37 is maintained at the minimum flow rate, the battery cooling performance achieved by the battery chiller 37 may be minimized. Thereafter, the method may end.

When it is determined in S25 that the battery temperature $T_1$ exceeds the target temperature T ($T_1$>T), it may be determined whether an internal temperature $T_I$ of the vehicle is equal to or less than a corrected temperature $T_K$ required for cooling the passenger compartment of the vehicle ($T_I \le T_K(=T_S+a)$) (S25-2). The corrected temperature $T_K$ may be obtained by adding a correction value a to a temperature $T_s$ required for cooling the passenger compartment of the vehicle directly set by the user ($T_K=T_S+a$). That is, the corrected temperature $T_K$ required for cooling the passenger compartment may be increased by the correction value a above the user's set temperature $T_s$ required for cooling the passenger compartment. By comparing the internal temperature $T_I$ of the vehicle with the corrected temperature $T_K$ required for cooling the passenger compartment, the flow rate of the refrigerant directed toward the battery chiller 37 may be adjusted, and thus the temperature of the battery-side coolant may be adjusted.

When it is determined in S25-2 that the internal temperature $T_I$ of the vehicle is equal to or less than the corrected temperature $T_K$ required for cooling the passenger compartment, the flow rate of the refrigerant directed toward the battery chiller 37 may be relatively increased above the minimum flow rate (S25-3), by increasing the opening amount of the chiller-side expansion valve 17 above the minimum opening amount by a predetermined value, the flow rate of the refrigerant directed toward the battery chiller 37 may be relatively increased above the minimum flow rate. As the opening amount of the chiller-side expansion valve 17 is relatively increased above the minimum opening amount, the flow rate of the refrigerant directed toward the evaporator 31 through the cooling-side expansion valve 15 may relatively decrease. Accordingly, the cooling performance achieved by the evaporator 31 may be relatively reduced, and thus the cooling performance with respect to the passenger compartment of the vehicle may be sacrificed. After S25-3, the method may return to S24.

When it is determined in S25-2 that the internal temperature $T_I$ of the vehicle is higher than the corrected temperature $T_K$ required for cooling the passenger compartment, the method may return to S24.

As described above, in the conditions in which the ambient temperature of the vehicle is relatively high and the HVAC subsystem 11 operates in the cooling mode, the flow rate of the refrigerant directed toward the battery chiller 37 may vary depending on the result of comparing the battery temperature $T_1$ and the target temperature T, so that the temperature of the battery-side coolant and the battery temperature $T_1$ may be adjusted.

When it is determined in S24 that the HVAC subsystem 11 does not operate in the cooling mode, it may be determined whether the battery temperature $T_1$ is higher than or equal to the target temperature T ($T_1 \ge T$) (S26).

When it is determined in S26 that the battery temperature $T_1$ is higher than or equal to the target temperature T ($T_1 \ge T$), it may be determined whether an ambient temperature $T_O$ of the vehicle is lower than the battery temperature $T_1$ ($T_O<T_1$) (S26-1).

When it is determined in S26-1 that the ambient temperature $T_O$ of the vehicle is lower than the battery temperature T1 ($T_O<T_1$), the battery-side coolant may be cooled by the ambient air by simultaneously operating the cooling fan 75 and operating the first battery-side pump 44 and the second battery-side pump 45 of the battery cooling subsystem 12 (S26-2). As the cooling fan 75, the first battery-side pump 44, and the second battery-side pump 45 operate, the battery-side coolant may exchange heat with the ambient air and release heat into the ambient air, and thus the battery-side coolant may be cooled to an appropriate temperature. Furthermore, as the active air flap 88 located in the front grille of the vehicle is opened, the ambient air may pass through the battery radiator 43, and thus the cooling performance of the battery-side coolant may be further improved. Considering that the vehicle is usually parked in an indoor space such as a charging station or a parking lot during the charging of the vehicle battery in the condition in which the ambient temperature of the vehicle is relatively high such as in summer, the ambient temperature $T_O$ may be relatively lower when the vehicle battery is charged than when the vehicle is travelling, and accordingly the ambient temperature $T_O$ may be lower than the battery temperature $T_1$. When the vehicle is parked in the indoor space, and the ambient temperature $T_O$ is lower than the battery temperature $T_1$, the battery-side coolant may be cooled by the ambient air by appropriately utilizing the first battery-side pump 44 and the second battery-side pump 45 of the battery cooling subsystem 12, the cooling fan 75, and the like. Because the HVAC subsystem 11 does not operate, power consumption may be saved.

After S26-2, it may be determined whether the battery temperature $T_1$ is equal to or less than the target temperature T ($T_1 \le T$) (S27). When it is determined in S27 that the battery temperature $T_1$ is equal to or less than the target temperature T, the method may end. When it is determined in S27 that the battery temperature $T_1$ exceeds the target temperature T, the method may return to S26-1.

When it is determined in S26-1 that the ambient temperature $T_O$ is higher than or equal to the battery temperature $T_1$ ($T_O \ge T_1$), the method may end.

When it is determined in S26 that the battery temperature $T_1$ is lower than the target temperature T ($T_1<T$), the battery-side coolant may be heated by operating the heater 42 of the battery cooling subsystem 12 (S26-3). As the battery-side coolant is heated by the heater 42, the temperature of the battery-side coolant may relatively increase. In the conditions in which the ambient temperature of the vehicle is relatively high and the HVAC subsystem 11 does not operate in the cooling mode, when the battery temperature $T_1$ is lower than the target temperature T, the temperature of the battery-side coolant may be relatively increased by the heater 42 of the battery cooling subsystem 12 so that the battery temperature $T_1$ may be appropriately increased.

After S26-3, it may be determined whether the battery temperature $T_1$ is higher than or equal to the target temperature T ($T_1 \ge T$) (S26-4). When it is determined in S26-4 that the battery temperature $T_1$ is higher than or equal to the target temperature T, the method may end. When it is determined in S26-4 that the battery temperature $T_1$ is lower than the target temperature T, the method may return to S26-3.

Figure 5:
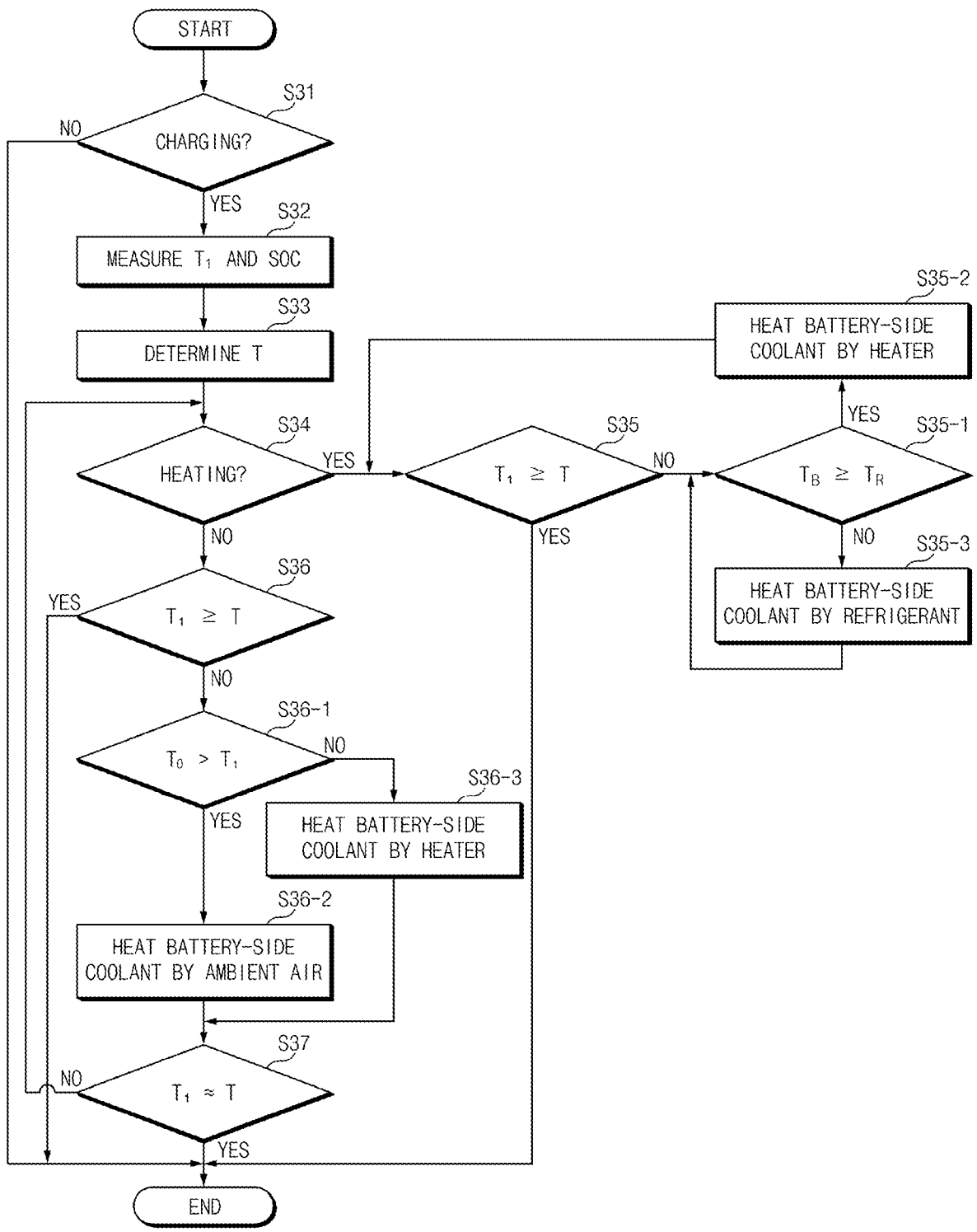
FIG. 5 illustrates a flowchart of a method for controlling a temperature of a vehicle battery according to an exemplary embodiment of the present disclosure, including determining whether a passenger compartment is heated.

FIG. 5 illustrates a flowchart of a method for controlling a temperature of a vehicle battery according to an exemplary embodiment of the present disclosure, including determining whether a passenger compartment is heated. For example, during the charging of the vehicle battery in a condition in which the ambient temperature of the vehicle is lower than a predetermined reference temperature such as in winter, the controller 100 may selectively control the HVAC subsystem 11 and the battery cooling subsystem 12 according to whether the HVAC subsystem 11 operates in a heating mode, the result of comparing an ambient temperature $T_O$ and a battery temperature $T_1$, and the result of comparing the battery temperature $T_1$ and a target temperature T, adjusting a temperature of the battery-side coolant circulating in the battery coolant loop 22.

Referring to FIG. 5, it may be determined whether the charging of the battery 41 is to be performed (S31). It may be determined whether the charging of the battery 41 is to be performed by detecting whether the charging port is opened.

When it is determined in S31 that the charging of the battery 41 is to be performed, a battery temperature $T_1$ may be measured by the battery temperature sensor 83, and SOC value of the battery 41 may be measured or predicted by the battery management system 110 (S32).

A target temperature T optimized for normal charging or fast charging of the battery 41 may be determined based on the measured battery temperature $T_1$ and the measured SOC value of the battery 41 (S33).

It may be determined whether the HVAC subsystem 11 operates in the heating mode (S34).

When it is determined in S34 that the HVAC subsystem 11 operates in the heating mode, it may be determined whether the battery temperature $T_1$ is higher than or equal to the target temperature T ($T_1 \geq T$) (S35).

When it is determined in S35 that the battery temperature $T_1$ is higher than or equal to the target temperature T ($T_1 \geq T$), the method may end. In the conditions in which the ambient temperature of the vehicle is relatively low and the HVAC subsystem 11 operates in the heating mode, when the battery temperature $T_1$ is higher than or equal to the target temperature T ($T_1 \geq T$), the controller 100 may determine that the battery temperature $T_1$ is higher than or equal to the target temperature T optimized for the charging of the battery 41.

When it is determined in S35 that the battery temperature $T_1$ is lower than the target temperature T ($T_1 < T$), it may be determined whether a temperature $T_B$ of the battery-side coolant is higher than or equal to a temperature $T_R$ of the refrigerant ($T_B \geq T_R$) (S35-1). The temperature $T_B$ of the battery-side coolant may be measured at the upstream point of the battery chiller 37 by the coolant temperature sensor 84, and the temperature $T_R$ of the refrigerant may be measured at the upstream point of the battery chiller 37 by the refrigerant temperature sensor 85.

When it is determined in S35-1 that the temperature $T_B$ of the battery-side coolant is higher than or equal to the temperature $T_R$ of the refrigerant ($T_B \geq T_R$), the battery-side coolant may be heated by operating the heater 42 of the battery cooling subsystem 12 (S35-2). Here, the first three-way valve 61 of the HVAC subsystem 11 may be switched to open the inlet of the first refrigerant bypass conduit 25 so that the refrigerant passing through the third passage 73 of the water-cooled heat exchanger 70 may be directed toward the compressor 32 through the first refrigerant bypass conduit 25. Furthermore, the second three-way valve 62 may be switched to close the outlet of the first connection conduit 22c and the second battery-side pump 45 may operate simultaneously so that the first coolant conduit 22a may be fluidly separated from the second coolant conduit 22b, and accordingly the battery-side coolant may circulate through the first coolant conduit 22a. The PTC heater 34b may maintain an operating temperature that matches a temperature required for heating the passenger compartment set by the user so that the HVAC subsystem 11 may operate in the heating mode to meet the user's set temperature required for heating the passenger compartment. After S35-2, the method may return to S35.

When it is determined in S35-1 that the temperature $T_B$ of the battery-side coolant is lower than the temperature $T_R$ of the refrigerant ($T_B < T_R$), the first three-way valve 61 of the HVAC subsystem 11 may be switched to close the inlet of the first refrigerant bypass conduit 25 and the second battery-side pump 45 may operate simultaneously so that the relatively high-temperature refrigerant may heat the battery-side coolant (S35-3). The refrigerant passing through the third passage 73 of the water-cooled heat exchanger 70 may be directed toward the first passage 37a of the battery chiller 37 through the external heat exchanger 35, and the battery-side coolant passing through the second passage 37b of the battery chiller 37 may absorb heat from the refrigerant. That is, the battery-side coolant may be heated by the relatively high-temperature refrigerant. Because the battery-side coolant is heated by the refrigerant, it may not be necessary for the heater 42 to operate, and thus power waste of the heater 42 may be prevented. As the refrigerant releases heat in the battery chiller 37, the heating performance achieved by the HVAC subsystem 11 may be relatively reduced, and accordingly the operating temperature of the PTC heater 34b may be relatively increased to meet the temperature required for heating the passenger compartment set by the user. However, the controller 100 may prevent the operating temperature of the PTC heater 34b from increasing in proportion to the user's set temperature required for heating the passenger compartment, and thus the temperature of the air flowing into the passenger compartment may be relatively lowered. That is, when the temperature $T_B$ of the battery-side coolant is lower than the temperature $T_R$ of the refrigerant, the heating performance with respect to the passenger compartment of the vehicle may be sacrificed. In the conditions in which the ambient temperature of the vehicle is relatively low and the HVAC subsystem 11 operates in the heating mode, the controller 100 may control the operation of some elements (the first three-way valve 61) of the HVAC subsystem 11 and the operation of some elements (the second battery-side pump 45 and the heater 42) of the battery cooling subsystem 12 based on the result of comparing the battery temperature $T_1$ and the target temperature T and the result of comparing the temperature $T_B$ of the battery-side coolant and the temperature $T_R$ of the refrigerant, appropriately adjusting the temperature of the battery-side coolant and the battery temperature $T_1$. By stopping the heater 42 and relatively lowering the operating temperature of the PTC heater 34b, power consumption may be saved.

After S35-3, the method may return to S35-1.

When it is determined in S34 that the HVAC subsystem 11 does not operate in the heating mode, it may be determined whether the battery temperature $T_1$ is higher than or equal to the target temperature T ($T_1 \geq T$) (S36).

When it is determined in S36 that the battery temperature $T_1$ is lower than the target temperature T ($T_1 < T$), it may be determined whether an ambient temperature $T_O$ of the vehicle exceeds the battery temperature $T_1$ ($T_O > T_1$) (S36-1). Considering that the vehicle is usually parked in an indoor space such as a charging station or a parking lot during the charging of the vehicle battery in the condition in which the ambient temperature of the vehicle is relatively low such as in winter, the ambient temperature $T_O$ of the vehicle may be relatively higher when the vehicle battery is charged than when the vehicle is travelling.

When it is determined in S36-1 that the ambient temperature $T_O$ exceeds the battery temperature $T_1$ ($T_O > T_1$), the battery-side coolant may be heated by the ambient air by simultaneously operating the cooling fan 75 and operating the first battery-side pump 44 and the second battery-side pump 45 of the battery cooling subsystem 12 (S36-2). That is, as the battery-side coolant exchanges heat with the ambient air (absorption of heat from the ambient air), the battery-side coolant may be heated to an appropriate temperature. Because the battery-side coolant is heated by the ambient air, it may not be necessary for the heater 42 to operate, and thus power waste of the heater 42 may be prevented. Furthermore, as the active air flap 88 located in the front grille of the vehicle is opened, the ambient air may pass through the battery radiator 43, and thus the heating performance of the battery-side coolant may be further improved. Here, by operating the powertrain-side pump 54 of the powertrain cooling subsystem 13, the battery-side coolant may absorb the waste heat of the powertrain components such as the electric motors 51*a* and 51*b* and the electric/electronic components 52*a*, 52*b*, and 52*c* through the water-cooled heat exchanger 70. Accordingly, the heating performance of the battery-side coolant may be improved, and the battery temperature may be increased rapidly. Considering that the vehicle is usually parked in the indoor space such as the charging station or the parking lot during the charging of the vehicle battery in the condition in which the ambient temperature of the vehicle is relatively low such as in winter, the ambient temperature $T_O$ may be relatively higher when the vehicle battery is charged than when the vehicle is travelling, and accordingly the ambient temperature $T_O$ may be higher than the battery temperature $T_1$. When the vehicle is parked in the indoor space, and the ambient temperature $T_O$ is higher than the battery temperature $T_1$, the battery-side coolant may be heated by the ambient air by appropriately utilizing the first battery-side pump 44 and the second battery-side pump 45 of the battery cooling subsystem 12, the cooling fan 75, and the like. Because the HVAC subsystem 11 and the heater 42 do not operate, power consumption may be saved.

After S36-2, it may be determined whether the battery temperature $T_1$ is substantially the same as the target temperature T (S37). It may be determined whether the battery temperature $T_1$ is the same as or similar to the target temperature. When it is determined that the battery temperature $T_1$ is substantially the same as the target temperature T, the controller 100 may determine that the battery temperature $T_1$ has reached the target temperature T optimized for the charging of the battery 41.

When it is determined in S36-1 that the ambient temperature $T_O$ is equal to or less than the battery temperature $T_1$ ($T_O \leq T_1$), the battery-side coolant may be heated by operating the heater 42 of the battery cooling subsystem 12 (S36-3). In the conditions in which the ambient temperature of the vehicle is relatively low and the HVAC subsystem 11 does not operate in the heating mode, when the ambient temperature $T_O$ is equal to or less than the battery temperature $T_1$, the battery-side coolant may be heated by the heater 42 of the battery cooling subsystem 12 so that the battery temperature $T_1$ may be relatively increased.

After S36-3, it may be determined whether the battery temperature $T_1$ is substantially the same as the target temperature T (S37). It may be determined whether the battery temperature $T_1$ is the same as or similar to the target temperature. When it is determined that the battery temperature $T_1$ is substantially the same as the target temperature T, the controller 100 may determine that the battery temperature $T_1$ has reached the target temperature T optimized for the charging of the battery 41.

When it is determined in S36 that the battery temperature $T_1$ is higher than or equal to the target temperature T ($T_1 \geq T$), the method may end.

Figure 6:
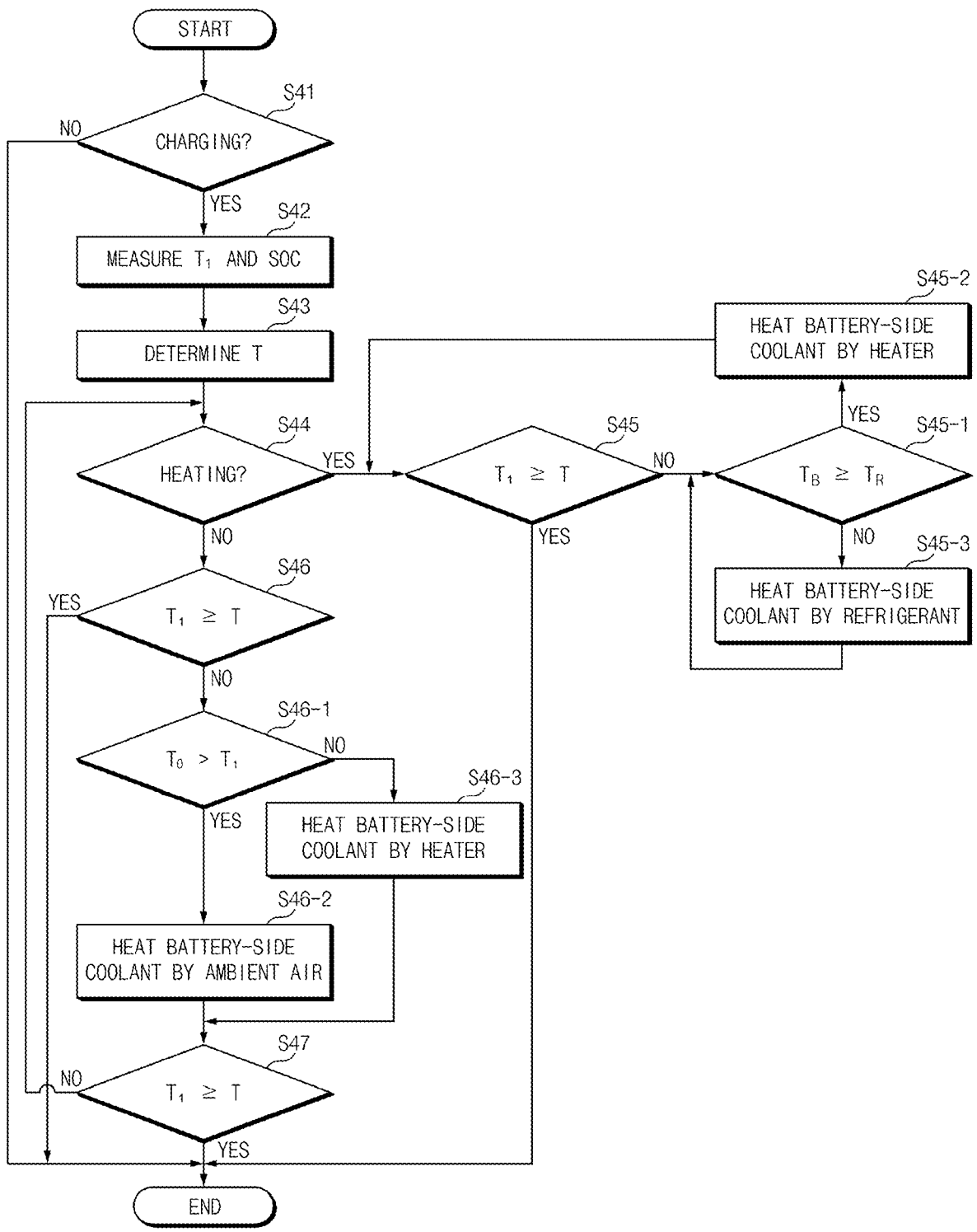
FIG. 6 illustrates a flowchart of a method for controlling a temperature of a vehicle battery according to another exemplary embodiment of the present disclosure, which is a modification to the exemplary embodiment illustrated in FIG. 5.

FIG. 6 illustrates a flowchart of a method for controlling a temperature of a vehicle battery according to another exemplary embodiment of the present disclosure, which is a modification to the exemplary embodiment illustrated in FIG. 5.

Referring to FIG. 6, it may be determined whether the charging of the battery 41 is to be performed (S41). It may be determined whether the charging of the battery 41 is to be performed by detecting whether the charging port is opened.

When it is determined in S41 that the charging of the battery 41 is to be performed, a battery temperature $T_1$ may be measured by the battery temperature sensor 83, and SOC value of the battery 41 may be measured or predicted by the battery management system 110 (S42).

A target temperature T optimized for normal charging or fast charging of the battery 41 may be determined based on the measured battery temperature $T_1$ and the measured SOC value of the battery 41 (S43).

It may be determined whether the HVAC subsystem 11 operates in a heating mode (S44).

When it is determined in S44 that the HVAC subsystem 11 operates in the heating mode, it may be determined whether the battery temperature $T_1$ is higher than or equal to the target temperature T ($T_1 \geq T$) (S45).

When it is determined in S45 that the battery temperature $T_1$ is higher than or equal to the target temperature T ($T_1 \geq T$), the method may end.

When it is determined in S45 that the battery temperature $T_1$ is lower than the target temperature T ($T_1 < T$), it may be determined whether a temperature $T_B$ of the battery-side coolant is higher than or equal to a temperature $T_R$ of the refrigerant ($T_B \geq T_R$) (S45-1). The temperature $T_B$ of the battery-side coolant may be measured at the upstream point of the battery chiller 37 by the coolant temperature sensor 84, and the temperature $T_R$ of the refrigerant may be measured at the upstream point of the battery chiller 37 by the refrigerant temperature sensor 85.

When it is determined in S45-1 that the temperature $T_B$ of the battery-side coolant is higher than or equal to the temperature $T_R$ of the refrigerant ($T_B \geq T_R$), the battery-side coolant may be heated by operating the heater 42 of the battery cooling subsystem 12 (S45-2). Here, the first three-way valve 61 of the HVAC subsystem 11 may be switched to open the inlet of the first refrigerant bypass conduit 25 so that the refrigerant passing through the third passage 73 of the water-cooled heat exchanger 70 may be directed toward the compressor 32 through the first refrigerant bypass conduit 25. Furthermore, the second three-way valve 62 may be switched to close the outlet of the first connection conduit 22*c* and the second battery-side pump 45 may operate simultaneously so that the first coolant conduit 22*a* may be fluidly separated from the second coolant conduit 22*b*, and accordingly the battery-side coolant may circulate through the first coolant conduit 22*a*. The PTC heater 34*b* may maintain an operating temperature that matches a temperature required for heating the passenger compartment set by the user so that the HVAC subsystem 11 may operate in the heating mode to meet the user's set temperature required for heating the passenger compartment. After S45-2, the method may return to S45.

When it is determined in S45-1 that the temperature $T_B$ of the battery-side coolant is lower than the temperature $T_R$ of the refrigerant ($T_B < T_R$), the first three-way valve 61 of the HVAC subsystem 11 may be switched to close the inlet of the first refrigerant bypass conduit 25 and the second battery-side pump 45 may operate simultaneously so that the relatively high-temperature refrigerant may heat the battery-side coolant (S45-3). The refrigerant passing through the third passage 73 of the water-cooled heat exchanger 70 may be directed toward the first passage 37*a* of the battery chiller 37 through the external heat exchanger 35, and the battery-side coolant passing through the second passage 37*b* of the battery chiller 37 may absorb heat from the refrigerant. That is, the battery-side coolant may be heated by the relatively high-temperature refrigerant. As the refrigerant releases heat in the battery chiller 37, the heating performance achieved by the HVAC subsystem 11 may be relatively reduced, and accordingly the operating temperature of the PTC heater 34*b* may be relatively increased to meet the temperature required for heating the passenger compartment set by the user. However, the controller 100 may prevent the operating temperature of the PTC heater 34*b* from increasing in proportion to the user's set temperature required for heating the passenger compartment, and thus the temperature of the air flowing into the passenger compartment may be relatively lowered. That is, when the temperature $T_B$ of the battery-side coolant is lower than the temperature $T_R$ of the refrigerant, the heating performance with respect to the passenger compartment of the vehicle may be sacrificed. In the conditions in which the ambient temperature of the vehicle is relatively low and the HVAC subsystem 11 operates in the heating mode, the controller 100 may control the operation of some elements (the first three-way valve 61) of the HVAC subsystem 11, and the operation of some elements (the second battery-side pump 45 and the heater 42) of the battery cooling subsystem 12 based on the result of comparing the battery temperature $T_1$ and the target temperature T and the result of comparing the temperature $T_B$ of the battery-side coolant and the temperature $T_R$ of the refrigerant, appropriately adjusting the temperature of the battery-side coolant and the battery temperature $T_1$.

After S45-3, the method may return to S45-1.

When it is determined in S44 that the HVAC subsystem 11 does not operate in the heating mode, it may be determined whether the battery temperature $T_1$ is higher than or equal to the target temperature T ($T_1 \geq T$) (S46).

When it is determined in S46 that the battery temperature $T_1$ is lower than the target temperature T ($T_1 < T$), it may be determined whether an ambient temperature $T_O$ of the vehicle exceeds the battery temperature $T_1$ ($T_O > T_1$) (S46-1). Considering that the vehicle is usually parked in an indoor space such as a charging station or a parking lot during the charging of the vehicle battery in the condition in which the ambient temperature of the vehicle is relatively low such as in winter, the ambient temperature $T_O$ may be relatively higher when the vehicle battery is charged than when the vehicle is travelling.

When it is determined in S46-1 that the ambient temperature $T_O$ exceeds the battery temperature $T_1$ ($T_O > T_1$), the battery-side coolant may be heated by the ambient air by simultaneously operating the cooling fan 75 and operating the first battery-side pump 44 and the second battery-side pump 45 of the battery cooling subsystem 12 (S46-2). That is, as the battery-side coolant exchanges heat with the ambient air (absorption of heat from the ambient air), the battery-side coolant may be heated to an appropriate temperature. Because the battery-side coolant is heated by the ambient air, it may not be necessary for the heater 42 to operate, and thus power waste of the heater 42 may be prevented. Furthermore, as the active air flap 88 located in the front grille of the vehicle is opened, the ambient air may pass through the battery radiator 43, and thus the heating performance of the battery-side coolant may be further improved. Here, by operating the powertrain-side pump 54 of the powertrain cooling subsystem 13, the battery-side coolant may absorb the waste heat of the powertrain components such as the electric motors 51*a* and 51*b* and the electric/electronic components 52*a*, 52*b*, and 52*c* through the water-cooled heat exchanger 70. Accordingly, the heating performance of the battery-side coolant may be improved, and the battery temperature may be increased rapidly. Considering that the vehicle is usually parked in the indoor space such as the charging station or the parking lot during the charging of the vehicle battery in the condition in which the ambient temperature of the vehicle is relatively low such as in winter, the ambient temperature $T_O$ may be relatively higher when the vehicle battery is charged than when the vehicle is travelling, and thus the ambient temperature $T_O$ may be higher than the battery temperature $T_1$. When the vehicle is parked in the indoor space, and the ambient temperature $T_O$ is higher than the battery temperature $T_1$, the battery-side coolant may be heated by the ambient air by appropriately utilizing the first battery-side pump 44 and the second battery-side pump 45 of the battery cooling subsystem 12, the cooling fan 75, and the like. Because the HVAC subsystem 11 and the heater 42 do not operate, power consumption may be saved.

After S46-2, it may be determined whether the battery temperature $T_1$ is higher than or equal to the target temperature T ($T_1 \geq T$) (S47). In the conditions in which the ambient temperature of the vehicle is relatively low and the HVAC subsystem 11 does not operate in the heating mode, when the ambient temperature $T_O$ of the vehicle is higher than the battery temperature $T_1$, and the battery-side coolant sufficiently absorbs heat from the ambient air, the controller 100 may determine that the battery temperature $T_1$ is higher than or equal to the target temperature T optimized for the charging of the battery 41.

When it is determined in S46-1 that the ambient temperature $T_O$ is equal to or less than the battery temperature $T_1$ ($T_O \leq T_1$), the battery-side coolant may be heated by operating the heater 42 of the battery cooling subsystem 12 (S46-3). In the conditions in which the ambient temperature of the vehicle is relatively low and the HVAC subsystem 11 does not operate in the heating mode, when the ambient temperature $T_O$ is equal to or less than the battery temperature, the battery-side coolant may be heated by the heater 42 of the battery cooling subsystem 12 so that the battery temperature $T_1$ may be relatively increased.

After S46-3, it may be determined whether the battery temperature $T_1$ is higher than or equal to the target temperature T (S47). In the conditions in which the ambient temperature of the vehicle is relatively low and the HVAC subsystem 11 does not operate in the heating mode, when the ambient temperature $T_O$ of the vehicle is equal to or less than the battery temperature $T_1$, and the battery-side coolant is heated by the heater 42 to sufficiently absorb heat, the controller 100 may determine that the battery temperature $T_1$ is higher than or equal to the target temperature T optimized for the charging of the battery 41.

When it is determined in S46 that the battery temperature $T_1$ is higher than or equal to the target temperature T ($T_1 \geq T$), the method may end.

As set forth above, according to exemplary embodiments of the present disclosure, at least one of the HVAC subsystem and the battery cooling subsystem may be controlled according to whether the HVAC subsystem operates, the result of comparing the ambient temperature and the battery temperature, and the result of comparing the battery temperature and the target temperature so that the temperature of the battery-side coolant circulating in the battery coolant loop may be adjusted, and thus the battery temperature may be adjusted to match the target temperature optimized for the charging of the battery.

According to exemplary embodiments of the present disclosure, in the conditions in which the ambient temperature of the vehicle is relatively high and the HVAC subsystem operates in the cooling mode, the flow rate of the refrigerant directed toward the battery chiller may vary depending on the result of comparing the battery temperature and the target temperature so that the temperature of the battery-side coolant and the battery temperature may be adjusted. Thus, the battery temperature may be adjusted to match the target temperature optimized for the charging of the battery.

According to exemplary embodiments of the present disclosure, considering that the vehicle is usually parked in the indoor space such as the charging station or the parking lot during the charging of the vehicle battery in the condition in which the ambient temperature of the vehicle is relatively high such as in summer, the ambient temperature may be relatively lower when the vehicle battery is charged than when the vehicle is travelling, and accordingly the ambient temperature may be lower than the battery temperature. When the vehicle is parked in the indoor space, and the ambient temperature is lower than the battery temperature, the battery-side coolant may be cooled by the ambient air by appropriately utilizing the first battery-side pump and the second battery-side pump of the battery cooling subsystem, the cooling fan, and the like. Because the HVAC subsystem does not operate, the power consumption thereof may be saved.

According to exemplary embodiments of the present disclosure, in the conditions in which the ambient temperature of the vehicle is relatively high and the HVAC subsystem does not operate in the cooling mode, when the battery temperature is lower than the target temperature, the battery-side coolant may be heated by the heater of the battery cooling subsystem, and thus the battery temperature may be appropriately adjusted.

According to exemplary embodiments of the present disclosure, in the conditions in which the ambient temperature of the vehicle is relatively low and the HVAC subsystem operates in the heating mode, the operation of some elements of the HVAC subsystem and the operation of some elements of the battery cooling subsystem may be controlled based on the result of comparing the battery temperature and the target temperature and the result of comparing the temperature of the battery-side coolant and the temperature of the refrigerant so that the temperature of the battery-side coolant and the battery temperature may be appropriately adjusted.

According to exemplary embodiments of the present disclosure, considering that the vehicle is usually parked in the indoor space such as the charging station or the parking lot during the charging of the vehicle battery in the condition in which the ambient temperature of the vehicle is relatively low such as in winter, the ambient temperature may be relatively higher when the vehicle battery is charged than when the vehicle is travelling, and accordingly the ambient temperature may be higher than the battery temperature. When the vehicle is parked in the indoor space, and the ambient temperature is higher than the battery temperature, the battery-side coolant may be heated by the ambient air by appropriately utilizing the first battery-side pump and the second battery-side pump of the battery cooling subsystem, the cooling fan, and the like. Because the HVAC subsystem does not operate, the power consumption thereof may be saved.

According to exemplary embodiments of the present disclosure, in the conditions in which the ambient temperature of the vehicle is relatively low and the HVAC subsystem does not operate in the heating mode, when the battery temperature is lower than the target temperature, and the ambient temperature is equal to or less than the battery temperature, the battery-side coolant may be heated by the heater of the battery cooling subsystem so that the battery temperature may be relatively increased.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a temperature of a battery, the method comprising:
   measuring a battery temperature and a state of charge (SOC) value of the battery when charging the battery;
   determining, by a controller, a target temperature optimized for charging of the battery according to the measured battery temperature and the measured SOC; and
   adjusting, by the controller, a temperature of a battery-side coolant by controlling at least one of a heating, ventilation, and air conditioning (HVAC) subsystem and a battery cooling subsystem according to whether the HVAC subsystem operates, a result of comparing an ambient temperature and the battery temperature, and a result of comparing the measured battery temperature and the target temperature,
   wherein the HVAC subsystem has a refrigerant loop through which a refrigerant circulates, and
   wherein the battery cooling subsystem has a battery coolant loop through which the battery-side coolant circulates.

2. The method of claim 1, further including:
   determining, by the controller, whether the battery temperature is equal to or less than the target temperature when the HVAC subsystem operates in a cooling mode in a condition in which the ambient temperature of a vehicle is higher than a predetermined temperature; and
   adjusting, by the controller, a flow rate of the refrigerant directed toward a battery chiller of the battery cooling subsystem to a minimum flow rate when the controller concludes that the battery temperature is equal to or less than the target temperature,
   wherein the battery chiller transfers heat between the refrigerant circulating in the refrigerant loop and the battery-side coolant circulating in the battery coolant loop.

3. The method of claim 2, further including:
   determining, by the controller, whether an internal temperature of the vehicle is equal to or less than a corrected temperature required for cooling a passenger compartment of the vehicle when the controller concludes that the battery temperature exceeds the target temperature; and
   increasing, by the controller, the flow rate of the refrigerant directed toward the battery chiller above the minimum flow rate when the controller concludes that the internal temperature is equal to or less than the corrected temperature required for cooling the passenger compartment,
   wherein the corrected temperature is obtained by adding a correction value to a temperature required for cooling the passenger compartment set by a user.

4. The method of claim 1, further including:
   determining, by the controller, whether the battery temperature is higher than or equal to the target temperature when the HVAC subsystem does not operate in a cooling mode in a condition in which the ambient temperature of a vehicle is higher than a predetermined temperature; and
   controlling, by the controller, a heater of the battery cooling subsystem to heat the battery-side coolant when the controller concludes that the battery temperature is lower than the target temperature.

5. The method of claim 4, further including:
   determining, by the controller, whether the ambient temperature of the vehicle is lower than the battery temperature when the controller concludes that the battery temperature is higher than or equal to the target temperature; and
   controlling, by the controller, the battery cooling subsystem to cool the battery-side coolant using an ambient air when the controller concludes that the ambient temperature of the vehicle is lower than the battery temperature.

6. The method of claim 1, further including:
   determining, by the controller, whether the temperature of the battery-side coolant is higher than or equal to a temperature of the refrigerant when the HVAC subsystem operates in a heating mode and the battery temperature is lower than the target temperature in a condition in which the ambient temperature of a vehicle is lower than a predetermined temperature; and
   controlling, by the controller, a heater of the battery cooling subsystem to heat the battery-side coolant when the controller concludes that the temperature of the battery-side coolant is higher than or equal to the temperature of the refrigerant.

7. The method of claim 6, further including:
   controlling, by the controller, the HVAC subsystem and the battery cooling subsystem to heat the battery-side coolant using the refrigerant when the controller concludes that the temperature of the battery-side coolant is lower than the temperature of the refrigerant.

8. The method of claim 1, further including:
   determining, by the controller, whether the ambient temperature of a vehicle exceeds the battery temperature when the HVAC subsystem does not operate in a heating mode and the battery temperature is lower than the target temperature in a condition in which the ambient temperature of the vehicle is lower than a predetermined temperature; and
   controlling, by the controller, the battery cooling subsystem to heat the battery-side coolant using an ambient air when the controller concludes that the ambient temperature of the vehicle exceeds the battery temperature.

9. The method of claim 8, further including:
controlling, by the controller, a heater of the battery cooling subsystem to heat the battery-side coolant when the controller concludes that the ambient temperature of the vehicle is equal to or less than the battery temperature.

10. A non-transitory computer readable storage medium on which a program for performing the method of claim 1 is recorded.

11. A vehicle thermal management system comprising:
a heating, ventilation, and air conditioning (HVAC) subsystem including a refrigerant loop through which a refrigerant circulates;
a battery cooling subsystem including a battery coolant loop through which a battery-side coolant for cooling a battery circulates and a battery chiller transferring heat between the refrigerant circulating in the refrigerant loop and the battery-side coolant circulating in the battery coolant loop; and
a controller,
wherein the controller is configured for:
measuring a battery temperature and a state of charge (SOC) value of the battery when charging the battery;
determining a target temperature optimized for charging of the battery according to the measured battery temperature and the measured SOC; and
adjusting a temperature of the battery-side coolant by controlling at least one of the HVAC subsystem and the battery cooling subsystem according to whether the HVAC subsystem operates, a result of comparing an ambient temperature and the battery temperature, and a result of comparing the measured battery temperature and the target temperature.

12. The vehicle thermal management system of claim 11, wherein the controller is further configured for:
determining whether the battery temperature is equal to or less than the target temperature when the HVAC subsystem operates in a cooling mode in a condition in which the ambient temperature of a vehicle is higher than a predetermined temperature; and
adjusting a flow rate of the refrigerant directed toward the battery chiller of the battery cooling subsystem to a minimum flow rate when the controller concludes that the battery temperature is equal to or less than the target temperature.

13. The vehicle thermal management system of claim 12, wherein the controller is further configured for:
determining whether an internal temperature of the vehicle is equal to or less than a corrected temperature required for cooling a passenger compartment of the vehicle when the controller concludes that the battery temperature exceeds the target temperature; and
increasing the flow rate of the refrigerant directed toward the battery chiller above the minimum flow rate when the controller concludes that the internal temperature is equal to or less than the corrected temperature required for cooling the passenger compartment,
wherein the corrected temperature is obtained by adding a correction value to a temperature required for cooling the passenger compartment set by a user.

14. The vehicle thermal management system of claim 11, wherein the controller is further configured for:
determining whether the battery temperature is higher than or equal to the target temperature when the HVAC subsystem does not operate in a cooling mode in a condition in which the ambient temperature of a vehicle is higher than a predetermined temperature; and
controlling a heater of the battery cooling subsystem to heat the battery-side coolant when the controller concludes that the battery temperature is lower than the target temperature.

15. The vehicle thermal management system of claim 14, wherein the controller is further configured for:
determining whether the ambient temperature of the vehicle is lower than the battery temperature when the controller concludes that the battery temperature is higher than or equal to the target temperature; and
controlling the battery cooling subsystem to cool the battery-side coolant using an ambient air when the controller concludes that the ambient temperature of the vehicle is lower than the battery temperature.

16. The vehicle thermal management system of claim 11, wherein the controller is further configured for:
determining whether the temperature of the battery-side coolant is higher than or equal to a temperature of the refrigerant when the HVAC subsystem operates in a heating mode and the battery temperature is lower than the target temperature in a condition in which the ambient temperature of a vehicle is lower than a predetermined temperature; and
controlling a heater of the battery cooling subsystem to heat the battery-side coolant when the controller concludes that the temperature of the battery-side coolant is higher than or equal to the temperature of the refrigerant.

17. The vehicle thermal management system of claim 16, wherein the controller is further configured for:
controlling the HVAC subsystem and the battery cooling subsystem to heat the battery-side coolant using the refrigerant when the controller concludes that the temperature of the battery-side coolant is lower than the temperature of the refrigerant.

18. The vehicle thermal management system of claim 11, wherein the controller is further configured for:
determining whether the ambient temperature of a vehicle exceeds the battery temperature when the HVAC subsystem does not operate in a heating mode and the battery temperature is lower than the target temperature in a condition in which the ambient temperature of the vehicle is lower than a predetermined temperature; and
controlling the battery cooling subsystem to heat the battery-side coolant using an ambient air when the controller concludes that the ambient temperature of the vehicle exceeds the battery temperature.

19. The vehicle thermal management system of claim 18, wherein the controller is further configured for:
controlling a heater of the battery cooling subsystem to heat the battery-side coolant when the controller concludes that the ambient temperature of the vehicle is equal to or less than the battery temperature.

* * * * *